US011039410B2

(12) United States Patent
Li

(10) Patent No.: US 11,039,410 B2
(45) Date of Patent: Jun. 15, 2021

(54) RESOURCE ALLOCATION METHODS AND NODES WITH SELF-ADAPTING TO DIFFERENT SYNCHRONIZATIONS

(71) Applicant: Telefonaktiebolaget LM Ericsson (publ), Stockholm (SE)

(72) Inventor: Yunxi Li, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 27 days.

(21) Appl. No.: 16/480,725

(22) PCT Filed: Nov. 27, 2017

(86) PCT No.: PCT/SE2017/051171
§ 371 (c)(1),
(2) Date: Jul. 25, 2019

(87) PCT Pub. No.: WO2018/174763
PCT Pub. Date: Sep. 27, 2018

(65) Prior Publication Data
US 2019/0357158 A1 Nov. 21, 2019

Related U.S. Application Data

(60) Provisional application No. 62/476,200, filed on Mar. 24, 2017.

(51) Int. Cl.
H04W 56/00 (2009.01)
H04W 4/029 (2018.01)
H04W 72/04 (2009.01)

(52) U.S. Cl.
CPC ......... *H04W 56/001* (2013.01); *H04W 4/029* (2018.02); *H04W 72/04* (2013.01)

(58) Field of Classification Search
CPC .... H04W 56/001; H04W 4/029; H04W 72/04
See application file for complete search history.

(56) References Cited

U.S. PATENT DOCUMENTS

2014/0328329 A1 11/2014 Novlan et al.
2017/0034799 A1 2/2017 Kim et al.
(Continued)

FOREIGN PATENT DOCUMENTS

FR 3027482 A1 * 4/2016 ............ H04W 4/026
WO WO 2015/168931 A1 11/2015
(Continued)

OTHER PUBLICATIONS

Huawei, HiSilicon, On Remaining Issues for Sidelink Synchronization, 3GPP TSG RAN WG2 Meeting #97, Athens, Greece, Feb. 13-17, 2017, R2-1701372 (Year: 2017).*
(Continued)

*Primary Examiner* — Shailendra Kumar
(74) *Attorney, Agent, or Firm* — Sage Patent Group

(57) ABSTRACT

A method of operating a network node grants a first resource for UE transmissions and identified by a time identifier mapped to a first synchronization reference and by a frequency identifier. The time and frequency identifiers are identified by a relative resource identifier. A second resource is reserved for transmissions by the UE, and is identified by the time identifier mapped to a second synchronization reference and by the frequency identifier. The first and second synchronization references can be used by a UE for transmissions synchronization. The relative resource identifier is sent to the UE for use in controlling transmissions. Responsive to information reported by the UE indicating the UE is using the second synchronization reference for transmissions synchronization, a new relative resource identifier is sent that identifies a time identifier mapped to the second
(Continued)

V2X Scenarios For An LTE-based NW synchronization reference that corresponds to a location of the second resource and identifies the frequency.

20 Claims, 12 Drawing Sheets

(56) References Cited

U.S. PATENT DOCUMENTS

| | | | |
|---|---|---|---|
| 2017/0295579 A1* | 10/2017 | Sheng | H04W 72/02 |
| 2018/0007576 A1 | 1/2018 | Lee et al. | |
| 2018/0220388 A1 | 8/2018 | Chae et al. | |

FOREIGN PATENT DOCUMENTS

| | | | | |
|---|---|---|---|---|
| WO | WO 2016/129908 A1 | | 8/2016 | |
| WO | 2017007285 A1 | | 1/2017 | |
| WO | WO-2017201719 A1 | * | 11/2017 | H04L 5/005 |

OTHER PUBLICATIONS

Intel, Details of resource pool design for sidelink V2V communication, 3GPP TSG RAN WG1 Meeting #86, Gothenburg, Sweden, Aug. 22-26, 2016, R1-166515 (Year: 2016).*

International Search Report and Written Opinion of the International Searching Authority for International Application No. PCT/SE2017/051171 dated Mar. 15, 2018.

Qualcomm Incorporated, "Synchronization Procedure for V2V," 3GPP TSG-RAN WG1 #83, R1-157078, Anaheim, USA, Nov. 16-20, 2015, 4 pages.

Huawei et al., "On Remaining Issues for Sidelink Synchronization," 3GPP TSG-RAN WG2 Meeting #97, R2-1701372, Athens, Greece, Feb. 13-17, 2017, 3 pages.

3GPP TS 36.331 V14.0.0, "$3^{rd}$ Generation Partnership Project; Technical Specification Group Radio Access Network; Evolved Universal Terrestrial Radio Access (E-UTRA); Radio Resource Control (RRC); Protocol specification (Release 14)," Technical Specification, Sep. 2016, 644 pages.

MCC Support, "Final Report of 3GPP TSG RAN WG1 #86bis v1.0.0", 3GPP TSG RAN WG1 Meeting #87, Reno, USA, R1-1611081, Nov. 14-18, 2016, 160 pages.

Vice-Chairwoman (InterDigital), "Report from LTE Break-Out Session (V2V, V2X, FeD2D, Short TTI, MIMO)," 3GPP TSG-RAN WG2 #97, Athens, Greece, R2-1702343, Feb. 13-17, 2017, 40 pages.

European Search Report for European Patent Application No. 17901607.6 dated Feb. 14, 2020.

3GPP TS 36.213 V14.2.0, "3rd Generation Partnership Project; Technical Specification Group Radio Access Network; Evolved Universal Terrestrial Radio Access (E-UTRA); Physical layer procedures (Release 14)," Technical Specification, Mar. 2017, pp. 385-441.

Intel Corporation, "Details of resource pool design for sidelink V2V communication," 3GPP TSG RAN WG1 Meeting #86, Gothenburg, Sweden, Aug. 22-26, 2016, R1-166515, 8 pages.

ITRI, "Enhancement to sidelink synchronization among multiple synchronization sources for V2X communication," 3GPP TSG RAN WG1 Meeting #86bis, Lisbon, Portugal, Oct. 10-14, 2016, R1-1609411, 4 pages.

Ericsson, "On V2X synchronization," 3GPP TSG-RAN WG2 #97, Athens, Greece, Feb. 13-17, 2017, Tdoc R2-1700946, 3 pages.

* cited by examiner

V2X Scenarios For An LTE-based NW

Zoning eNB Adapts Different Synchronization References

RESOURCE ALLOCATION METHODS AND NODES WITH SELF-ADAPTING TO DIFFERENT SYNCHRONIZATIONS

CROSS REFERENCE TO RELATED APPLICATIONS

This application is a 35 U.S.C. § 371 national stage application of PCT International Application No. PCT/SE2017/051171, filed on Nov. 27, 2017, which itself claims priority to U.S. Provisional Application No. 62/476,200 filed Mar. 24, 2017, the disclosure and content of both of which are incorporated herein by reference in their entireties.

TECHNICAL FIELD

The present disclosure relates to methods and operations by network nodes and user equipments for D2D or more particularly V2X communications.

BACKGROUND

In Release 12, the LTE standard was extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

Device-to-Device (D2D) communications enable devices in the proximity of each other to communicate in a peer-to-peer (direct) fashion rather than communicating through some wireless access point or base station. In practice, D2D UEs in the 3GPP LTE system utilize the cellular uplink spectrum that is they transmit D2D signals or channels in the uplink part of the spectrum.

According to the currently standardized and state of the art solutions, D2D operation by a User Equipment (UE) is in a half-duplex mode, i.e. the UE can either transmit D2D signals/channels or receive D2D signals/channels. There may also be D2D relay UEs that may relay some signals to other D2D UEs. There is also control information for D2D, some of which is transmitted by D2D UEs and the other is transmitted by eNBs (e.g., D2D resource grants for D2D communication transmitted via cellular DL control channels). The D2D transmissions may occur on resources which are configured by the network or selected autonomously by the D2D UE.

In LTE, D2D communication supports two different modes of D2D operation: mode 1 and mode 2.

In mode 1, the location of the resources for transmission of the scheduling assignment by the broadcasting UE comes from the eNodeB. The location of the resource(s) for transmission of the D2D data by the broadcasting UE comes from the eNodeB.

In mode 2, a resource pool for scheduling assignment is pre-configured and/or semi-statically allocated. The UE on its own selects the resource for scheduling assignment from the resource pool for scheduling assignment to transmit its scheduling assignment.

D2D operation is a generic term which may comprise of transmission and/or reception of any type of D2D signals (e.g. physical signals, physical channel etc) by a D2D communication capable UE and/or by D2D discovery capable UE. D2D operation is therefore also called as D2D transmission, D2D reception, D2D communication etc.

D2D UE is also interchangeably called as proximity services (ProSe) capable UE. Similarly, D2D operation is also interchangeably called as ProSe operation. D2D discovery capable UE is also referred to as UE capable of ProSe direct discovery and D2D direct communication UE is also referred to as UE capable ProSe direct communication. D2D operation may also interchangeably be called as ProSe operation. The link and/or carrier that is used for the ProSe direct communication and ProSe direct discovery between UEs is referred to as sidelink. The ProSe operation performed by the UE may broadly comprise of ProSe reception (i.e. receiving ProSe signals) and/or ProSe transmission (i.e. transmitting ProSe signals).

V2X Communication in LTE

Rel-14 extended the device to device work to include support for V2x communication, which includes any combination of direct communication between vehicles, pedestrians and infrastructure. Therefore, x may denote 'vehicular' (aka V2V) or x may denote 'pedestrian' (aka V2P) or x may denote 'infrastructure' (aka V2I) and so on. The embodiments described herein are applicable for any type of D2D operation including ProSe, V2x and so on.

V2x communication may take advantage of a network (NW) infrastructure, when available, but at least basic V2x connectivity can be possible even in case of lack of NW coverage. Providing an LTE-based V2x interface may be economically advantageous because of the LTE economies of scale and it may enable tighter integration between communications with the NW infrastructure (V2I) and V2P and V2V communications, as compared to using a dedicated V2x technology.

FIG. 1 is a schematic diagram illustrating V2x scenarios for an LTE-based Radio Access Network NW. As shown in FIG. 1, V2I (vehicle-to-infrastructure) communications may be provided between a vehicle and the radio access network (RAN), V2V (vehicle-to-vehicle) communications may be provided directly between different vehicles (without communicating through the radio access network), and V2P (vehicle-to-pedestrian) communications may be provided directly between a vehicle and a device held/carried by the pedestrian (e.g., a smartphone, a tablet computer, etc.). V2X communications are meant to include any or all of V2I, V2P, and V2V communications.

V2x communications may carry both non-safety and safety information, where each of the applications and services may be associated with specific requirements sets, e.g., in terms of latency, reliability, capacity, etc.

Sidelink Operations

Sidelink transmissions (also known as D2D or ProSe) over the so-called PC5 interface in cellular spectrum have been standardized in 3GPP since Rel-12. In 3GPP Rel-12 two different operative modes have been specified in 3GPP. In one mode (mode-1), a UE in RRC_CONNECTED mode requests D2D resources and the eNB grants them via PDCCH (DCI5) or via dedicated signalling. In another mode (mode-2), a UE autonomously selects resources for transmission from a pool of available resources that the eNB provides in broadcast via SIB signalling for transmissions on carriers other than the PCell or via dedicated signaling for transmission on the PCell. Therefore, unlike the first operation mode, the second operation mode can be performed also by UEs in RRC_IDLE.

In Rel-14, the usage of sidelink is extended to the V2x domain. ETSI has defined two types of messages for road safety: Co-operative Awareness Message (CAM) and Decentralized Environmental Notification Message (DENM). The design of the sidelink physical layer in Rel-12 has been dictated by the assumptions of few amount of UEs competing for the same physical resources in the spectrum, to carry voice packet for MCPTT traffic, and low-mobility. On the other hand, in V2x the sidelink should be able to cope with higher load scenario (i.e. hundreds of cars could potentially contend physical resources), to carry time/event triggered V2x messages (CAM, DENM), and high mobility.

For such reasons, 3GPP has discussed possible enhancements to the sidelink physical layer. In particular, in Rel-14 two new operations modes have been introduced: mode-3 which includes sidelink semi-persistent scheduling (SL SPS) and dynamic SL grant also known as mode-1, and mode-4 which corresponds to UE autonomous resource selection also known as mode-2 with some enhancements. Such enhancements include the so-called sensing procedure in which the UE is required to sense the channel for at least a certain time-frame before selecting the proper resources.

Zoning

The eNB has the ability to create different zones of different shapes within the cell, and assign defined transmission pools to different zones.

3GPP has agreed to support zoning for V2X. Zoning includes dividing the serviced area (i.e., area of V2X operation) into different zones. Each zone is associated with a subset of the V2X available resources. The division of the serviced area usually has a repeated pattern so that spatial reutilization of the V2X resources is ensured, which may be similar to operations in cellular systems. FIG. 2 illustrates example zoning, where each of the zones 0-8 is associated with a different subset of the V2X resources. UEs transmit using the resources associated with the zone in which they are located.

Grouping users in zones with different subsets of resources has several advantages, including the reduction of near-far problems and the minimization of hidden-node problems.

Synchronization Aspects

A new synchronization framework has been introduced as an enhancement to sidelink. In particular, the UE can select as a synchronization source not only the eNB timing (i.e. acquired via the PSS/SSS (primary synchronization signal/ secondary synchronization signal)) or the timing of UEs in the surroundings (i.e. acquired via the SLSS (Sidelink Synchronization Signals)), but also from a Global Navigation Satellite System (GNSS), such as Global Positioning System (GPS), Global Orbiting Navigation Satellite System (GLONASS), and Galileo. Which synchronization source the UE should prioritize is indicated by the eNB or it can be pre-configured UTC time obtained from GNSS can be used for synchronization of V2X sidelink communication between UEs on a V2X dedicated carrier. Specifically, in the current specification [1], the GNSS-based DFN can be derived from the UTC time by the following formulae:

---

DFN= Floor (0.1*(Tcurrent −Tref)) mod 1024
SubframeNumber= Floor (Tcurrent −Tref) mod 10
Where, Tcurrent is the current UTC time and Tref is the reference UTC time 00:00:00 on Gregorian calendar date 1 January, 1900 (midnight between Thursday, December 31, 1899 and Friday, January 1, 1900).

---

In RAN1 #86bis meeting [2], it was agreed that only one transmission synchronization reference is applicable at a specific time based on the selection criterion, and UE should select synchronization based on the priority order defined.

The eNB could provide only one mode 3 TX pool for a UE and use a specified sidelink timing (GNSS or eNB) for resource assignment as per the V2X configuration, which may be configured with multiple synchronization references. To enable eNB to be aware of the synchronization reference selected/reselected by a UE, the following was agreed to at RAN2 #97 meeting [3].

---

Agreement:
=> UE indicates the synchronization reference it is using.
=> One transmission pool for mode 3 is configured taking into account the timing reference of the UE

---

Potential Problems with Existing Solutions

As used herein, the term "resource" refers to time-frequency resource, which can be specified by frequency identifier and time identifier. In LTE system, time identifier of a resource is system frame number and sub-frame number based on eNB synchronization reference. In V2X feature, GNSS synchronization reference is introduced. As a result, one particular resource may have different time identifiers when using different synchronization references.

Two terms used in this document, are: RelativeResourceIdentifier and MirrorResource.

When the synchronization reference is known, a triple, say RelativeResourceIdentifier (FREQUENCY, SYSTEM_FRAME_NUMBER, SUBFRAME_NUMBER) can be used to specify a resource:

"FREQUENCY" is the frequency information of the resources, e.g. index of frequency or PRB.

"SYSTEM_FRAME_NUMBER" is the system frame number of the resource;

"SUBFRAME_NUMBER" is the sub frame number of the resource.

FIG. 3 illustrates resource identifier signaling with unaligned synchronization. Referring to FIG. 3, if the UE is using eNB sync, the RelativeResourceIdentifier of resource "X" is (f1, 90, 7), while if the UE is using GNSS sync, the RelativeResourceIdentifier of resource "X" is (f1, 90, 2).

If two resources have the same RelativeResourceIdentifier regardless of the synchronization reference being used, they are MirrorResource of each other.

A resource and its MirrorResource may be identical, e.g. when two resources are using same synchronization reference, or when they are using two synchronization references which are completely aligned (identical). FIG. 4 illustrates resource identifier signaling with aligned synchronization. Referring to FIG. 4, eNB synchronization reference and GNSS synchronization reference are completely aligned. The resource specified by RelativeResourceIdentifier (f1, 90, 7) using eNB synchronization reference and the resource specified by the same RelativeResourceIdentifier using GNSS synchronization reference will refer to same resource, i.e. resource "X".

A resource and its MirrorResource may be different, e.g. when two resources are using two unaligned synchronization references. FIG. 3 illustrates that eNB synchronization reference and GNSS synchronization reference are not aligned. The resource specified by RelativeResourceIdentifier (f1, 90, 7) using eNB synchronization reference refers to resource "X", while the resource specified by same RelativeResourceIdentifier using GNSS synchronization reference refers to resource "Y".

When the eNB configures resources to the UE, it will only specify RelativeResourceIdentifier of the resource without specifying the synchronization reference being used, because that is supposed to be known to both UE and eNB. Sometimes, equivalent information of RelativeResourceIdentifier instead of RelativeResourceIdentifier itself will be configured to the UE, e.g. when eNB configure SPS resources, RelativeResourceIdentifier can be calculated based on SPS configuration.

When a UE with ongoing V2X transmission changes its synchronization, the UE indicates the new synchronization reference to eNB, and there can be two alternatives regarding UE behaviors after that:

Alternative 1: UE suspends the ongoing transmission until it obtains new resources associated with new synchronization, which will consume some time and lead to additional service delay, and consume some signaling resources.

Alternative 2: UE continues using the resources specified by the RelativeResourceIdentifier configured by eNB. Because the UE has changed its synchronization reference, the resource specified by the RelativeResourceIdentifier can be different from that configured by eNB before, which may lead to interference or receiving failure as a result of the resource specified by RelativeResourceIdentifier using new synchronization reference not being included in the receiving resource pool.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

Some embodiments of the present disclosure are directed to a method of operating a network node providing control in a radio access network (RAN). The method includes granting a first resource for use by a user equipment, UE, for transmissions. The first resource is identified by a time identifier mapped to a first synchronization reference and by a frequency identifier. The time identifier and the frequency identifier are identified by a relative resource identifier. The method further includes reserving a second resource for use by the UE for transmissions. The second resource is identified by the time identifier mapped to a second synchronization reference and by the frequency identifier, where the first and second synchronization references can be used by a UE for synchronization of the transmissions. The method further includes sending the relative resource identifier to the UE for use in controlling the UE's transmissions. Responsive to information reported by the UE indicating that the UE is using the second synchronization reference for synchronization of the transmissions, the method sends to the UE a new relative resource identifier that identifies a time identifier mapped to the second synchronization reference that corresponds to a location of the second resource and identifies the frequency.

Potential advantages of this method include that the UE does not need to suspend ongoing transmission to request new resources, which avoids unnecessary service delay to the UE. The granted resources can continue to be used, which reduces the cost to system resource utilization efficiency from the operations granting the new resources. The network node does not need to reserve resources for both synchronization references, which avoids resource waste.

Some other embodiments are directed to a network node that includes a transceiver, at least one processor coupled to the transceiver, and at least one memory coupled to the at least one processor. The at least one memory stores program code that when executed by the at least one processor causes the at least one processor to perform operation. The operations include granting a first resource for use by a user equipment, UE, for transmissions. The first resource is identified by a time identifier mapped to a first synchronization reference and by a frequency identifier. The time identifier and the frequency identifier are identified by a relative resource identifier. The operations further include reserving a second resource for use by the UE for transmissions. The second resource is identified by the time identifier mapped to a second synchronization reference and by the frequency identifier. The first and second synchronization references can be used by a UE for synchronization of the transmissions. The operations include sending the relative resource identifier to the UE via the transceiver for use in controlling the UE's transmissions. Responsive to information reported by the UE indicating that the UE is using the second synchronization reference for synchronization of the transmissions, the operations send to the UE via the transceiver a new relative resource identifier that identifies a time identifier mapped to the second synchronization reference that corresponds to a location of the second resource and identifies the frequency.

Some other embodiments are directed to a network node that includes a granting module, a reserving module, a sending module, and another sending module. The granting module is for granting a first resource for use by a user equipment, UE, for transmissions, the first resource being identified by a time identifier mapped to a first synchronization reference and by a frequency identifier, the time identifier and the frequency identifier being identified by a relative resource identifier. The reserving module is for reserving a second resource for use by the UE for transmissions, the second resource being identified by the time identifier mapped to a second synchronization reference and by the frequency identifier, wherein the first and second synchronization references can be used by a UE for synchronization of the transmissions. The sending module is for sending the relative resource identifier to the UE use in controlling the UE's transmissions. The another sending module is for, responsive to information reported by the UE indicating that the UE is using the second synchronization reference for synchronization of the transmissions, sending to the UE a new relative resource identifier that identifies a time identifier mapped to the second synchronization reference that corresponds to a location of the second resource and identifies the frequency.

Some other embodiments are directed to a method of operating a network node providing control in a radio access network, RAN. The method includes identifying an adapting area where user equipments, UEs, are likely to switch from using a first synchronization reference for synchronization of transmissions to using a second synchronization reference for synchronization of transmissions. For a transmission resource pool that will be used by a UE that is located in a zone that at least partially overlaps the adapting area, the method configures resources for the transmission resource pool that are defined to correspond to both of the first synchronization reference and the second synchronization reference. The method also communicates the transmission resource pool to the UE.

Some other embodiments are directed to a network node the includes a transceiver, at least one processor coupled to the transceiver, and at least one memory coupled to the at least one processor. The at least one memory stores program code that when executed by the at least one processor causes the at least one processor to perform operations. The operations include identifying an adapting area where user equipments, UEs, are likely to switch from using a first synchronization reference for synchronization of transmissions to using a second synchronization reference for synchronization of transmissions. For a transmission resource pool that will be used by a UE that is located in a zone that at least partially overlaps the adapting area, the operations configure resources for the transmission resource pool that are defined to correspond to both of the first synchronization reference and the second synchronization reference. The operations communicate the transmission resource pool to the UE.

Some other embodiments are directed to a network node the includes an adapting area identifying module, a configuring transmission resource pool module, and a communication module. The adapting area identifying module is for identifying an adapting area where user equipments, UEs, are likely to switch from using a first synchronization reference for synchronization of transmissions to using a second synchronization reference for synchronization of transmissions. The configuring transmission resource pool module, for a transmission resource pool that will be used by a UE that is located in a zone that at least partially overlaps the adapting area, is for configuring resources for the transmission resource pool that are defined to correspond to both of the first synchronization reference and the second synchronization reference. The communication module is for communicating the transmission resource pool to the UE.

Some other embodiments are directed to a method of operating a user equipment, UE, communicating with a radio access network, RAN. The method includes responsive to the UE changing from using a first synchronization reference for synchronization of transmissions to using a second synchronization reference for synchronization of transmissions, determining whether the UE has an ongoing transmission and has a network node granted the UE a resource that the UE has not yet used. The method responds to the determination being that the UE has the ongoing transmission and the network node has granted the UE the resource that the UE has not yet used, by calculating a relative resource identifier of the resource using the second synchronization reference, wherein the relative resource identifier identifies a time identifier and a frequency identifier of the resource. The method transmits using the resource.

Some other embodiments are directed to a user equipment, UE, that includes a transceiver, at least one processor coupled to the transceiver, and at least one memory coupled to the at least one processor. The at least one memory stores program code that when executed by the at least one processor causes the at least one processor to perform operations. The operations include, responsive to the UE changing from using a first synchronization reference for synchronization of transmissions to using a second synchronization reference for synchronization of transmissions, determining whether the UE has an ongoing transmission and has a network node granted the UE a resource that the UE has not yet used. Responsive to the determination being that the UE has the ongoing transmission and the network node has granted the UE the resource that the UE has not yet used, the operations calculate a relative resource identifier of the resource using the second synchronization reference, wherein the relative resource identifier identifies a time identifier and a frequency identifier of the resource. The operations transmit using the resource.

Some other embodiments are directed to a user equipment, UE, that includes a determining module, a calculating module, and a transmitting module. The determining module is for, responsive to the UE changing from using a first synchronization reference for synchronization of transmissions to using a second synchronization reference for synchronization of transmissions, determining whether the UE has an ongoing transmission and has a network node granted the UE a resource that the UE has not yet used. The calculating module is for, responsive to the determination being that the UE has the ongoing transmission and the network node has granted the UE the resource that the UE has not yet used, calculating a relative resource identifier of the resource using the second synchronization reference, wherein the relative resource identifier identifies a time identifier and a frequency identifier of the resource. The transmitting module is for transmitting using the resource.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
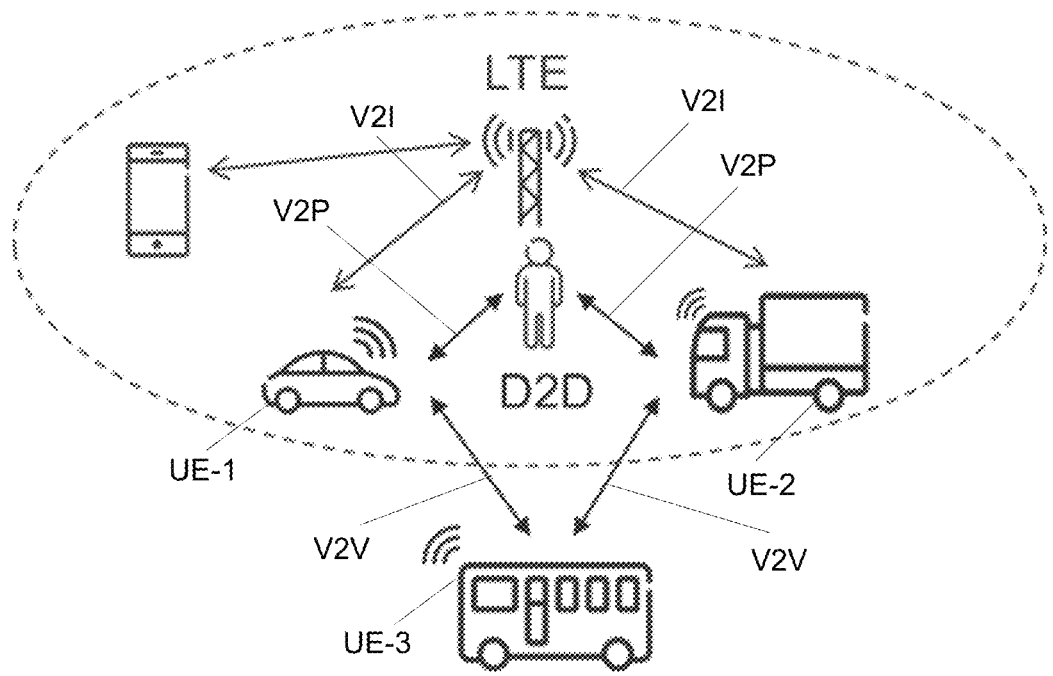
FIG. 1 is a schematic diagram illustrating V2x scenarios for an LTE-based Radio Access Network (RAN)
Figure 2:
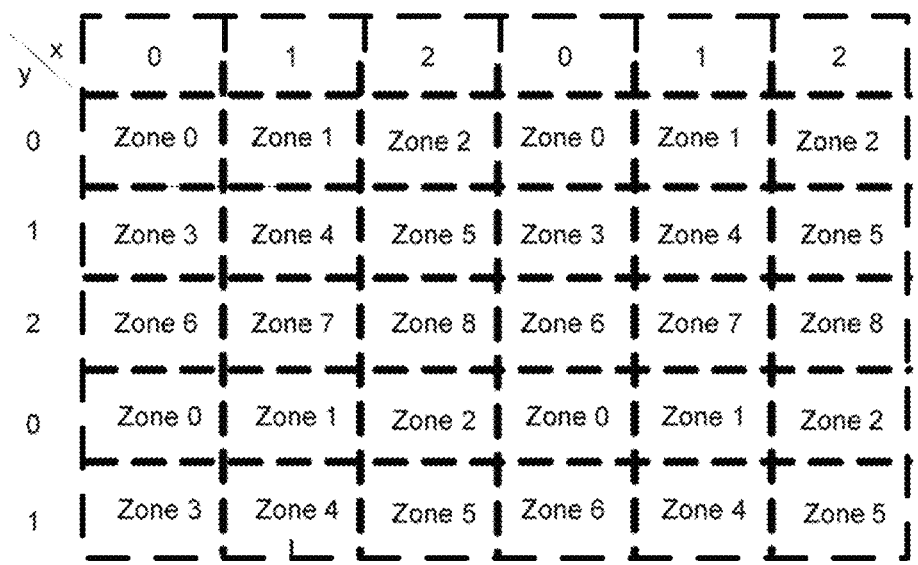
FIG. 2 illustrates example zoning, where each of the zones 0-8 is associated with a different subset of the V2X resources.
Figure 3:
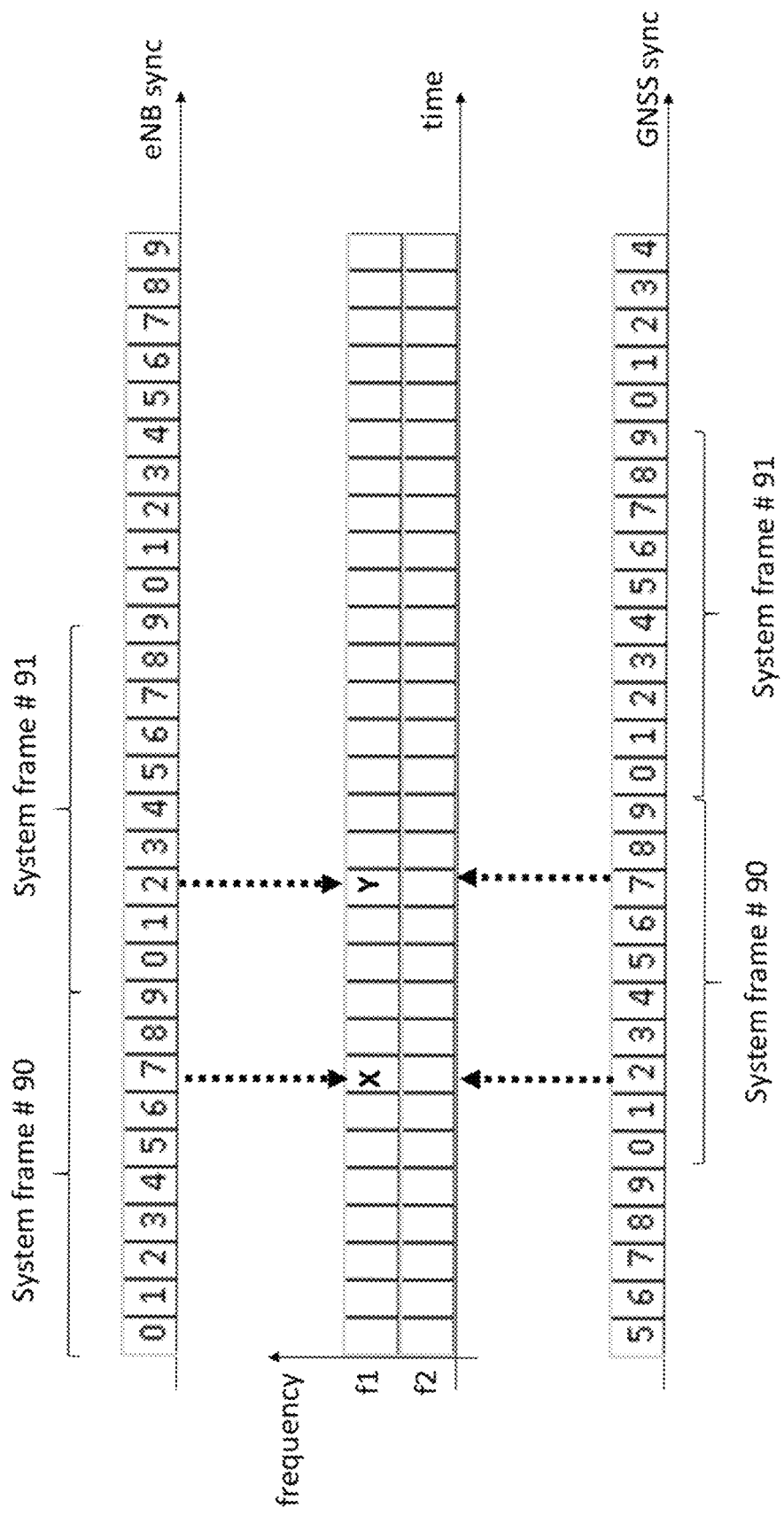
FIG. 3 illustrates resource identifier signaling with unaligned synchronization.
Figure 4:
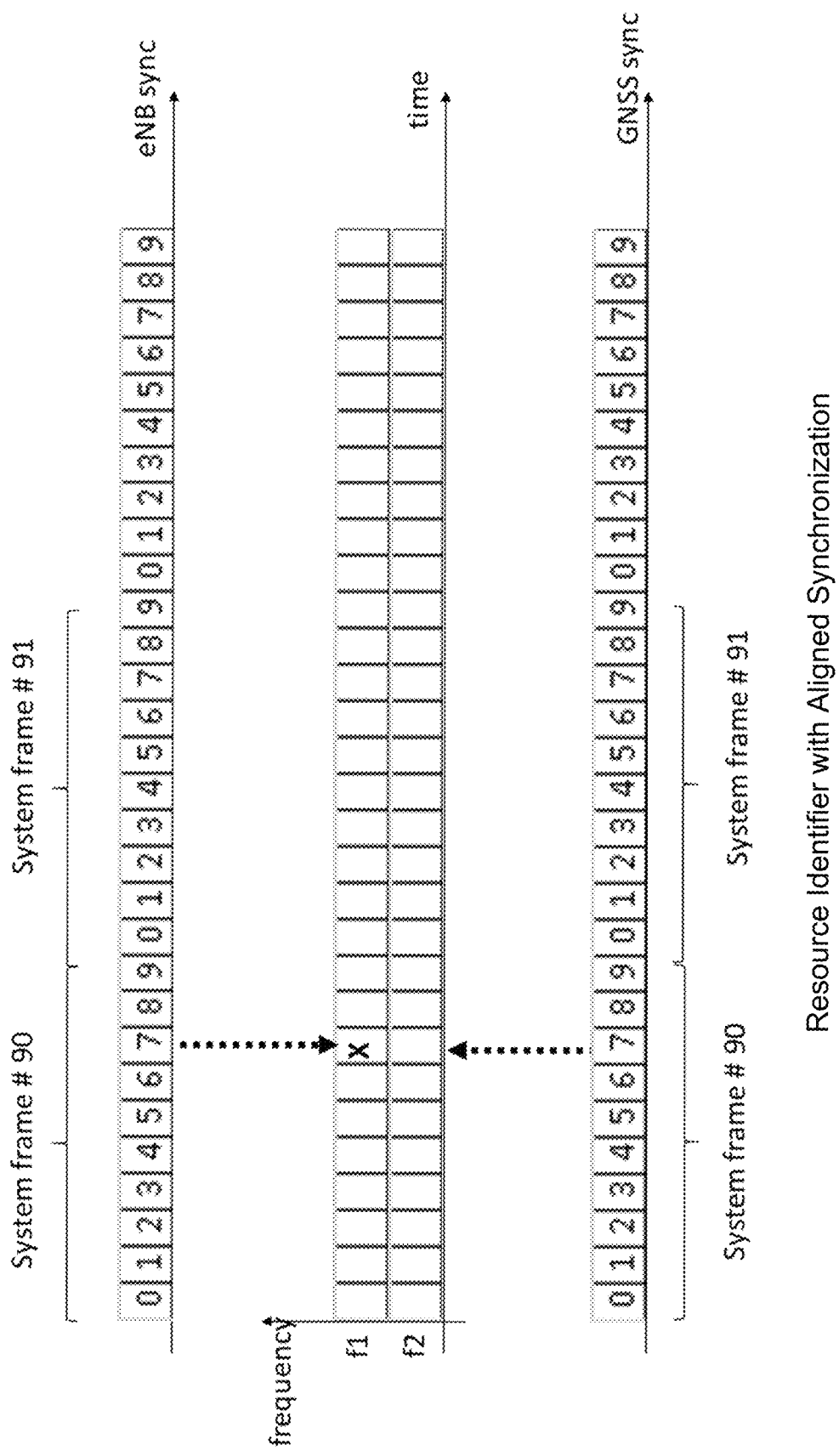
FIG. 4 illustrates resource identifier signaling with aligned synchronization.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Various embodiments of the present disclosure are directed to operations and methods by UEs and network nodes for performing V2x and other D2D communications.

Terminology

In some embodiments, a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC (Mobile Switching Centre), MME (Mobile Management Entity), etc), O&M (Operations & Maintenance), OSS (Operations Support System), SON (Self Organizing Networks), positioning node (e.g. E-SMLC), MDT (Minimization of Drive Tests), etc.

In some embodiments, the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

In some embodiments, the non-limiting term WAN (wireless access network or RAN, radio access network) node is used. The WAN node can be a UE (e.g. D2D UE) or a network node (e.g. access point, BS etc). The WAN node is also interchangeably called as cellular node, NW source node etc.

The term time resource used herein may correspond to any type of physical resource or radio resource expressed in terms of length of time. Examples of time resources are: symbol, time slot, subframe, radio frame, TTI, interleaving time etc.

The embodiments are described for LTE. However, the embodiments are applicable to any Radio Access Technology (RAT) or multi-RAT systems, where the UE receives and/or transmit signals (e.g. data) e.g. LTE FDD/TDD (frequency division duplex/time division duplex), WCDMA/HSPA (wideband code division multiple access/ high speed packet access), GSM/GERAN (Global System for Mobile communications/GSM EDGE Radio Access Network), Wi Fi, WLAN, CDMA2000, 5G, NR (new radio), etc.

Example Elements of UE and Network Node

Figure 6:
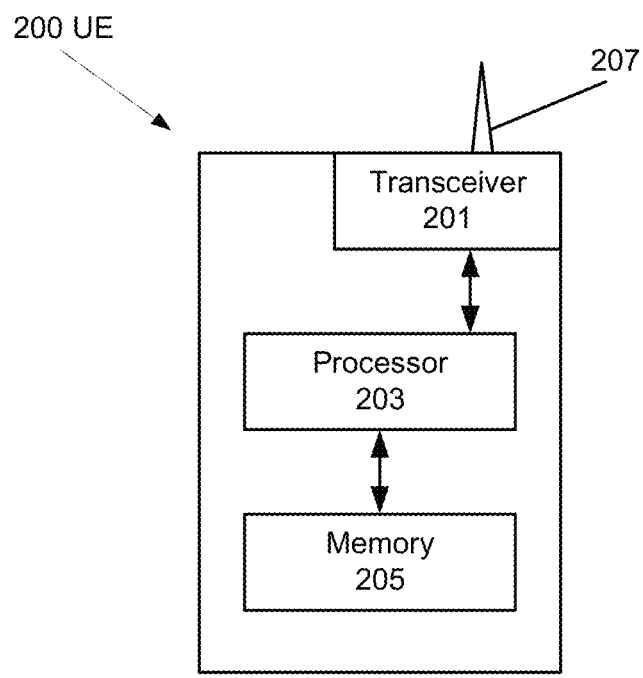
FIG. 6 is a block diagram illustrating elements of a UE configured to operate according to some embodiments of inventive concepts.

FIG. 6 is a block diagram illustrating elements of a UE 200 (also referred to as a wireless terminal, a wireless communication device, a wireless communication terminal, user equipment, a user equipment node/terminal/device, etc.) configured to provide V2X communication according to embodiments of inventive concepts. As shown, the UE 200 may include an antenna 207, and a transceiver circuit 201 (also referred to as a transceiver) including a transmitter and a receiver configured to provide uplink and downlink radio communications with a base station of a radio access network, and to provide V2X sidelink communications directly with other V2X wireless communication devices. The UE 200 may also include a processor circuit 203 (also referred to as a processor) coupled to the transceiver circuit, and a memory circuit 205 (also referred to as memory) coupled to the processor circuit. The memory circuit 205 may include computer readable program code that when executed by the processor circuit 203 causes the processor circuit to perform operations according to embodiments disclosed herein for a UE. According to other embodiments, processor circuit 203 may be defined to include memory so that a separate memory circuit is not required. The UE 200 may also include an interface (such as a user interface) coupled with processor 203, and/or the UE 200 may be incorporated in a vehicle.

As discussed herein, operations of the UE 200 may be performed by processor 203 and/or transceiver 201. For example, processor 203 may control transceiver 201 to transmit communications through transceiver 201 over a radio interface to another UE and/or to receive communications through transceiver 201 from another UE over a radio interface. Moreover, modules may be stored in memory 205, and these modules may provide instructions so that when instructions of a module are executed by processor 203, processor 203 performs respective operations (e.g., operations discussed below with respect to Example Embodiments).

Figure 7:
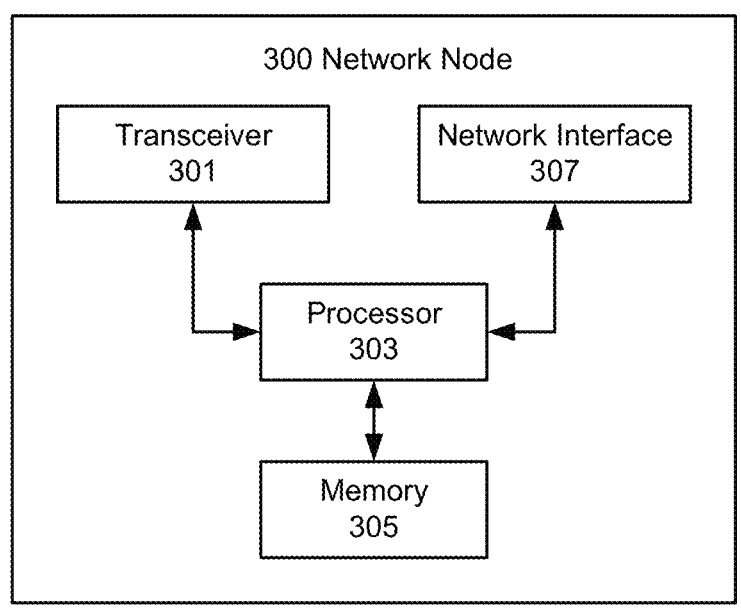
FIG. 7 is a block diagram illustrating elements of a network node configured to operate according to some embodiments of inventive concepts.

FIG. 7 is a block diagram illustrating elements of a network node 300 (also referred to as a node, base station, eNB, eNodeB, etc.) of a Radio Access Network (RAN) configured to provide cellular communication according to embodiments of inventive concepts. As shown, the network node 300 may include a transceiver circuit 301 (also referred to as a transceiver) including a transmitter and a receiver configured to provide uplink and downlink radio communications with UEs. The network node 300 may include a network interface circuit 307 (also referred to as a network interface) configured to provide communications with other nodes (e.g., with other base stations) of the RAN. The network node may also include a processor circuit 303 (also referred to as a processor) coupled to the transceiver circuit, and a memory circuit 305 (also referred to as memory) coupled to the processor circuit. The memory circuit 305 may include computer readable program code that when executed by the processor circuit 303 causes the processor circuit to perform operations according to embodiments disclosed herein for a network node. According to other embodiments, processor circuit 303 may be defined to include memory so that a separate memory circuit is not required.

As discussed herein, operations of the network node 300 may be performed by processor 303, network interface 307, and/or transceiver 301. For example, processor 303 may control transceiver 301 to transmit communications through transceiver 301 over a radio interface to one or more UEs and/or to receive communications through transceiver 301 from one or more UEs over a radio interface. Similarly, processor 303 may control network interface 307 to transmit communications through network interface 307 to one or more other network nodes and/or to receive communications through network interface from one or more other network nodes. Moreover, modules may be stored in memory 305, and these modules may provide instructions so that when instructions of a module are executed by processor 303, processor 303 performs respective operations (e.g., operations discussed below with respect to example embodiments of network nodes).

Introduction to Embodiment A—eNB Adapts Different Sync

In accordance with one embodiment, referred to as Embodiment A, when eNB configures a resource to UE(s), the RelativeResourceIdentifier of the resource may refer to two different resources when using eNB synchronization reference and GNSS synchronization reference respectively. The eNB reserves these two different resources for the UE(s) regardless of the synchronization reference being used by the UE(s).

When the eNB receives the information from the UE indicating the synchronization reference it is using, the eNB configures a new RelativeResourceIdentifier to the UE in such a way that the resource specified by the new RelativeResourceIdentifier with new synchronization reference is identical to that specified by the old RelativeResourceIdentifier with old synchronization reference.

Figure 8:
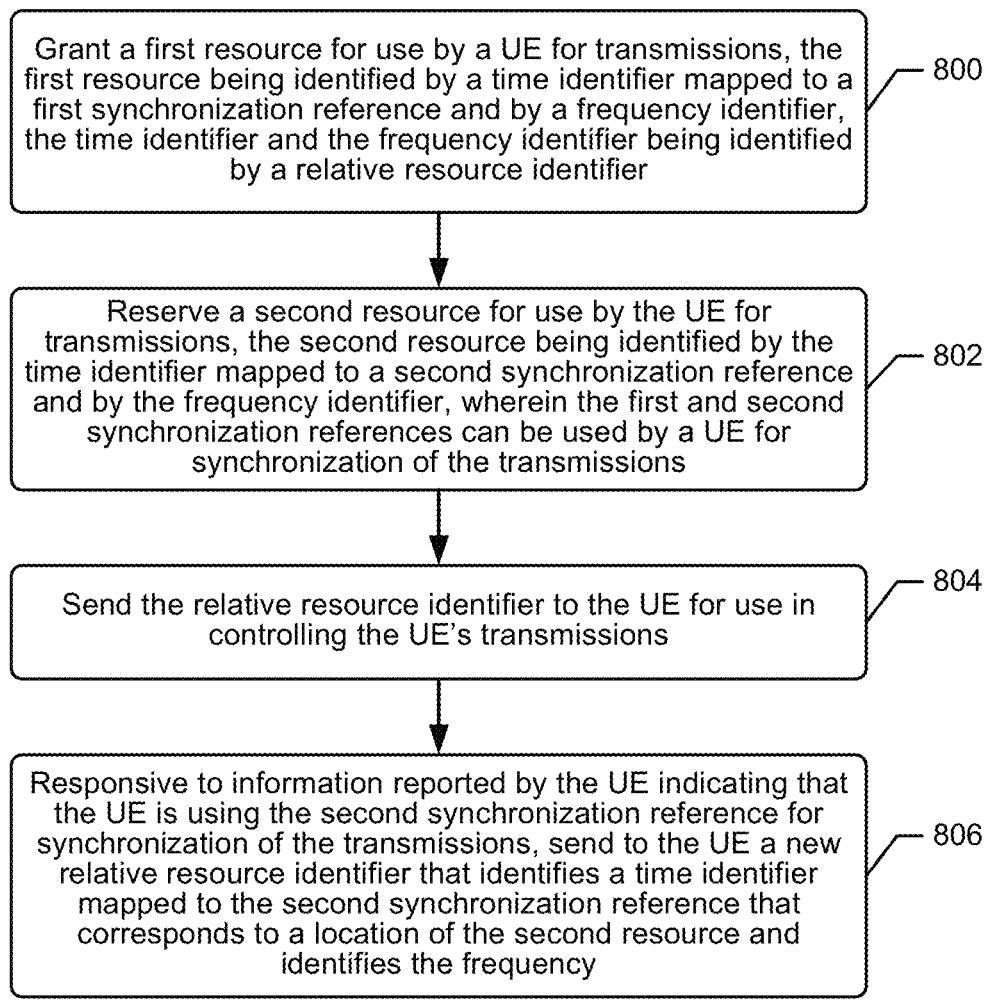
FIGS. 8-15 are flowcharts of methods of operating a network node providing control in a RAN according to some embodiments of inventive concepts.

FIG. 8 is a flowchart of a method of operating a network node providing control in a RAN. Referring to FIG. 8, for each of a plurality of synchronization references that a UE can use for synchronization of transmissions, the network node grants 800 a first resource for use by a UE for transmissions. The first resource being identified by a time identifier mapped to a first synchronization reference and by a frequency identifier. The time identifier and the frequency identifier being identified by a relative resource identifier. The network node reserves 802 a second resource for use by the UE for transmissions. The second resource being identified by the time identifier mapped to a second synchronization reference and by the frequency identifier. The first and second synchronization references can be used by a UE for synchronization of the transmissions. The second resource may be configured as a MirrorResource of the first resource as explained herein. The network node sends 804 the relative resource identifier to the UE for use in controlling the UE's transmissions. Responsive to information reported by the UE indicating that the UE is using the second synchronization reference for synchronization of the transmissions, the network node sends 806 to the UE a new relative resource identifier that identifies a time identifier mapped to the second synchronization reference that corresponds to a location of the second resource and identifies the frequency.

In FIG. 8, the relative resource identifier can be a RelativeResourceIdentifier identifying a frequency, a system frame number, and a subframe number. The sending 804 of the relative resource identifier to the UE, can include transmitting the RelativeResourceIdentifier through an eNB. Accordingly, the operations of the network node of FIG. 8 may reside separate from, partially within, or entirely within an eNB.

In one embodiment, the first synchronization reference is an eNB synchronization reference signal, and the RelativeResourceIdentifier is configured to identify a system frame number and a subframe number of the eNB synchronization reference signal. The new relative resource identifier comprises a new RelativeResourceIdentifier, and the second synchronization reference is a Global Navigation Satellite System, GNSS, synchronization reference. The new RelativeResourceIdentifier is configured to identify a system frame number and a subframe number of the GNSS synchronization reference signal.

In another embodiment, the first synchronization reference is a Global Navigation Satellite System, GNSS, synchronization reference, and the RelativeResourceIdentifier is configured to identify a system frame number and a subframe number of the GNSS synchronization reference signal. The new relative resource identifier is a new RelativeResourceIdentifier, and the second synchronization reference is an eNB synchronization reference. The new RelativeResourceIdentifier is configured to identify a system frame number and a subframe number of the eNB synchronization reference signal.

It is to be understood that some embodiments may use less than all of the operations illustrates in FIG. 8. For example, a method of operating a network node providing control in a RAN can include: granting (800) a first resource for use by a user equipment, UE, for transmissions, the first resource being identified by a time identifier mapped to a first synchronization reference and by a frequency identifier, the time identifier and the frequency identifier being identified by a relative resource identifier; and reserving (802) a second resource for use by the UE for transmissions, the second resource being identified by the time identifier mapped to a second synchronization reference and by the frequency identifier, wherein the first and second synchronization references can be used by a UE for synchronization of the transmissions.

In another embodiment, a method of operating a network node providing control in a RAN, includes: granting (800) a first resource for use by a user equipment, UE, for transmissions, the first resource being identified by a time identifier mapped to a first synchronization reference and by a frequency identifier, the time identifier and the frequency identifier being identified by a relative resource identifier; sending (804) the relative resource identifier to the UE for use in controlling the UE's transmissions; and responsive to information reported by the UE indicating that the UE is using the second synchronization reference for synchronization of the transmissions, sending (806) to the UE a new relative resource identifier that identifies a time identifier mapped to the first synchronization reference that corresponds to a location of the first resource and identifies the frequency.

Potential Advantages

Potential advantages of thes approaches include that the UE does not need to suspend ongoing transmission to request new resources, which avoids unnecessary service delay to the UE. The granted resources can continue to be used, which reduces the cost to system resource utilization efficiency from the operations granting the new resources.

The network node (eNB) does not need to reserve resources for both synchronization references, which avoids resource waste.

Introduction to Embodiment B—UE Adapts Different Sync

In accordance with another embodiment, referred to as Embodiment #2, when UE changes synchronization, it transforms the RelativeResourceIdentifier associated with old synchronization to the new RelativeResourceIdentifier associated with new synchronization, and continues using the resources specified by the new resource-tuple associated with new synchronization without requesting new resources from eNB.

Figure 5:
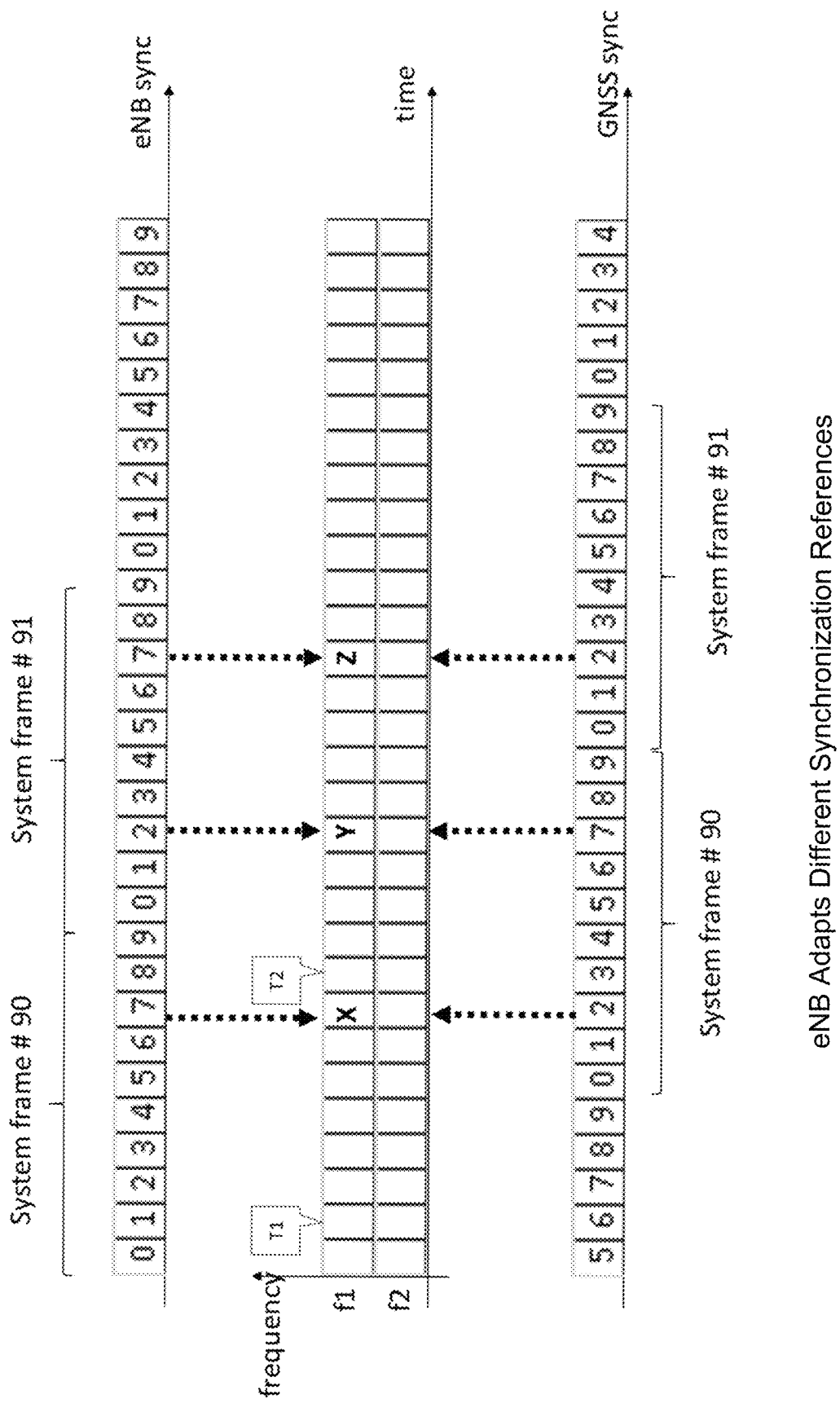
FIG. 5 illustrates operations and methods whereby an eNB adapts different synchronization references according to some embodiments of inventive concepts.

1. Embodiment A—eNB Adapts Different Synchronization Reference 1.1 Determine Adapting Area FIG. 5 illustrates operations and methods whereby an eNB adapts different synchronization references. These operations and methods are further described below with regard to FIGS. 9-15. Referring to FIG. 5, the possibility of a UE changing its synchronization reference in one area can be higher than other area. For example, when a UE is configured by a network to use GNSS synchronization reference and the UE enters a tunnel with LTE coverage, resulting in it becoming likely that the UE will change its synchronization reference from GNSS to eNB due to weak/unstable GNSS signal, and the UE may change its synchronization reference back to GNSS upon exiting the tunnel.

When a UE changes its synchronization reference, it will send information to the network indicating it is using a new synchronization reference. It is assumed that the location information of the UE is available to the eNB. By considering locations and frequencies of the information of the UE indicating new synchronization reference, the network can identify an "adapting area", where a UE is more like to changes it synchronization reference.

Geographical information, which can be obtained from another system, can be used by the network to identify the "adapting area", e.g., tunnel, canyon between tall mountains, etc.

The "adapting area" can be preconfigured by the network, and can be dynamically updated by the network.

1.2 Configure Synchronization Reference

The possibility of a UE locating in "adapting area" is considered by the network when it configures the synchronization reference. For example, based on the network predicting that the UE may become located in the "adapting area", it responsively configures the UE to use eNB synchronization reference, which can avoid the potential synchronization change in the UE.

1.3 Configure V2X Resources

The eNB can configure a resource pool, a particular resource, or a set of resources to the UE to use to perform V2X transmission.

1.3.1 eNB Configures Particular Resource to UE

When an eNB grants a resource to a UE, the eNB can reserve the MirrorResource for the UE. As shown in FIG. 5, the UE is using eNB synchronization reference, and the eNB grants the resource with RelativeResourceIdentifier being (f1, 90, 7) to UE, which is resource "X". Furthermore, the eNB can also reserve the corresponding MirrorResource, which is (f1, 90, 7) in GNSS synchronization reference, i.e. resource "Y".

For each resource in a transmitting pool (both mode 3 pool and mode 4 pool), eNB adds its corresponding MirrorResource to receiving pool, if it is not stored there yet.

Figure 9:
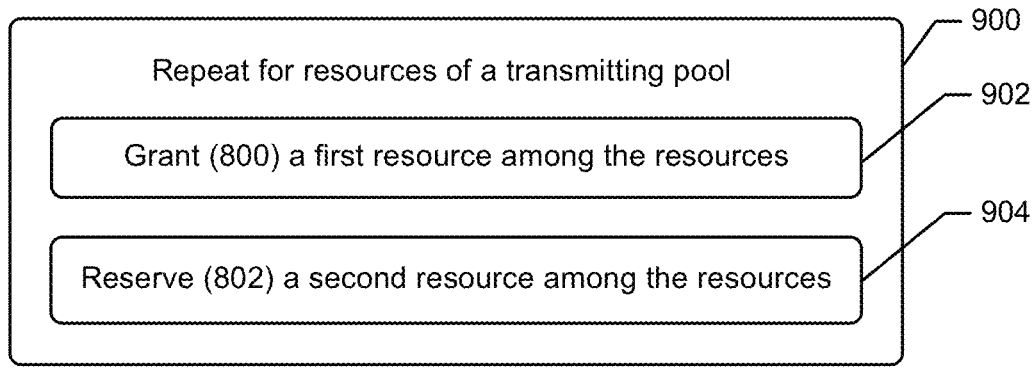

FIG. 9 is a flowchart of a related method of operating a network node providing control in a RAN. Referring to FIG. 9, the operations repeat 900 for resources of a transmitting pool that the UE can use for the transmissions, operations 902 to grant (800 in FIG. 8) a first resource among the resources and operations 904 to reserve (802 in FIG. 8) a second resource among the resources. As will be appreciated, the operations can further repeat 900 the sending 804 in FIG. 8 the relative resource identifier each resource to the UE for use in controlling the UE's transmissions.

If an eNB grants a resource to UE and also reserves the corresponding MirrorResource for the UE, when the timing of the granted resource has passed and the eNB has not receive a synchronization indication from the UE, the eNB can recycle the corresponding MirrorResource for use by another UE. For example, referring to FIG. 5, the UE is using eNB synchronization reference, and the eNB grants the resource with RelativeResourceIdentifier being (f1, 90, 7) to the UE, i.e. resource "X", and the eNB reserves the corresponding MirrorResource, i.e. resource "Y". In this scenario, it is assumed that the eNB does not receive an indication of new synchronization from the UE. At T2, the eNB operates to recycle the corresponding MirrorResource "Y", i.e. the eNB can operate to schedule use of resource "Y" by another UE.

The UE uses the resource specified by RelativeResourceIdentifier configured by eNB based on its current synchronization reference.

Figure 10:
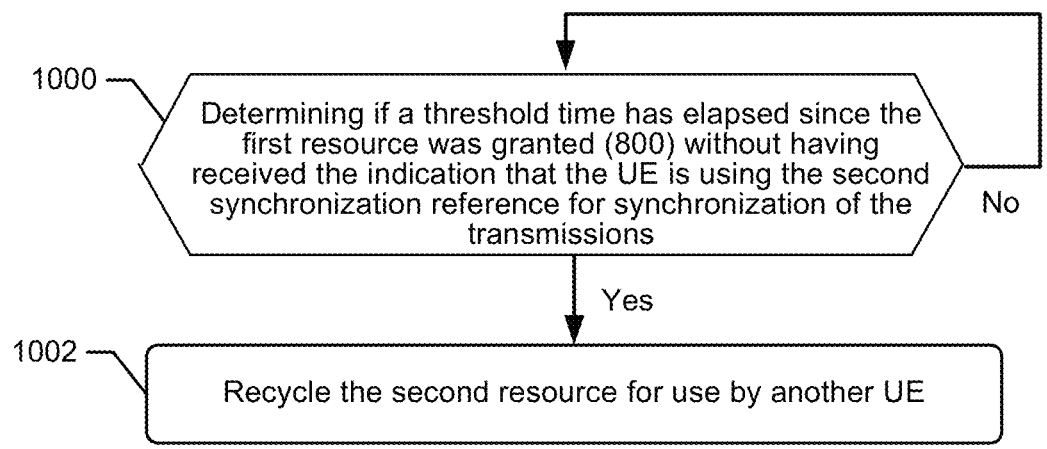

FIG. 10 is a flowchart of a related method of operating a network node providing control in a RAN. Referring to FIG. 10, the method includes determining (1000) if a threshold time has elapsed since the first resource was granted 800 (FIG. 8) without having received the indication that the UE is using the second synchronization reference for synchronization of the transmissions. Responsive to determining 1000 that the threshold time has elapsed, the method recycles 1002 the second resource for use by another UE.

Figure 12:
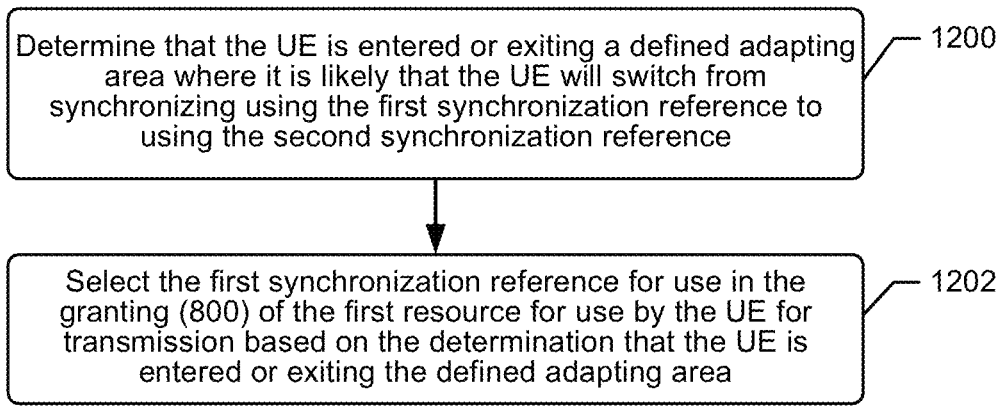

FIG. 12 is a flowchart of a related method of operating a network node that is explained with further reference to Section 1.2 Configure Synchronization Reference herein. Referring to FIG. 12 and Section 1.2, the network node determines 1200 that the UE is entered or exiting a defined adapting area where it is likely that the UE will switch from synchronizing using the first synchronization reference to using the second synchronization reference. The network node then selects 1202 the first synchronization reference for use in the granting 800 (FIG. 8) of the first resource for use by the UE for transmission based on the determination 1200 that the UE is entered or exiting the defined adapting area.

Figure 13:
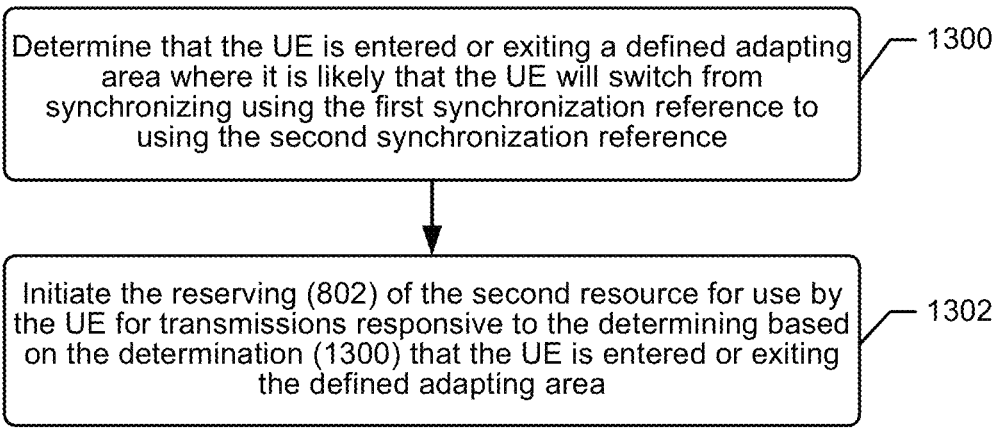

FIG. 13 is a flowchart of a related method of operating a network node that is explained with further reference to Section 1.1 Determine Adapting Area herein. Referring to FIG. 13 and Section 1.1, the network node determines 1300 that the UE is entered or exiting a defined adapting area where it is likely that the UE will switch from synchronizing using the first synchronization reference to using the second synchronization reference. The network node then initiates 1302 the reserving 802 (FIG. 8) of the second resource for use by the UE for transmissions responsive to the determining based on the determination 1300 that the UE is entered or exiting the defined adapting area.

1.3.2 eNB Configures a Transmission Resource Pool to UE

When the eNB configures a resource pool to a UE which may become located in a defined "adapting area", the resource pool that is configured should be associated with both GNSS synchronization and eNB synchronization.

When the resource pool is associated with a zone, and there is overlap between the zone and the "adapting area", the resource pool should be configured to be associated with both GNSS synchronization and eNB synchronization.

When the eNB configures a transmission resource pool (to one particular UE or multiple UEs), for each resource of the pool, if its MirrorResources is not in the same pool the eNB operates to:

Responsive to determining that it is possible to add the MirrorResources to the same pool, the eNB adds the MirrorResources to the pool, and otherwise the eNB reserves the MirrorResource, i.e. the eNB does not schedule any traffic using the concerned MirrorResource, neither for LTE nor for V2X; and/or If the MirrorResources is not in the receiving pool, the eNB adds it to receiving pool.

Figure 14:
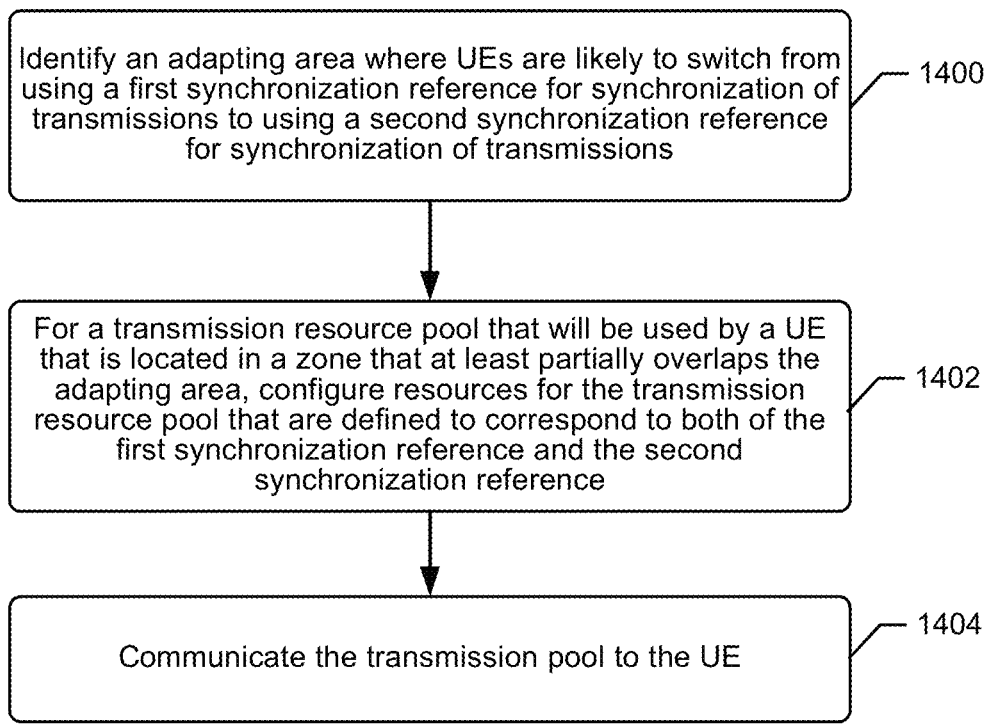

FIG. 14 is a flowchart of a related method of operating a network node to configure a transmission resource pool for one or more UEs. Referring to FIG. 14, the network node identifies 1400 an adapting area where UEs are likely to switch from using a first synchronization reference for synchronization of transmissions to using a second synchronization reference for synchronization of transmissions. For a transmission resource pool that will be used by a UE that is located in a zone that at least partially overlaps the adapting area, the network node responsively configures 1402 resources for the transmission resource pool that are defined to correspond to both of the first synchronization reference and the second synchronization reference. The network node communicates 1404 the transmission resource pool to the UE.

The network node may broadcast the transmission pool to UEs located in the zone.

To configure 1402 resources for the transmission resource pool, the network node may configure a pair of relative resource identifiers that identify a corresponding pair of resources for the transmission resource pool, one of the relative resource identifiers identifying a system frame number and a subframe number where one of the resources is located relative to the first synchronization reference, and the other one of the relative resource identifiers identifying a system frame number and a subframe number where the other one of the resources is located relative to the second synchronization reference. The network node may then reserve at least the pair of resources for the transmission resource pool for use by at least one UE. The network node may further configure 1402 resources for the transmission resource pool, by configuring further pairs of relative resource identifiers that identify corresponding further pair of resources for the transmission resource pool, and reserving at least the further pair of resources for the transmission resource pool for use by UEs.

The first synchronization reference can be an eNB synchronization reference signal, and the second synchronization reference can a GNSS synchronization reference. Alternatively, the first synchronization reference can be a Global Navigation Satellite System, GNSS, synchronization reference, and the second synchronization reference can be a eNB synchronization reference.

Figure 15:
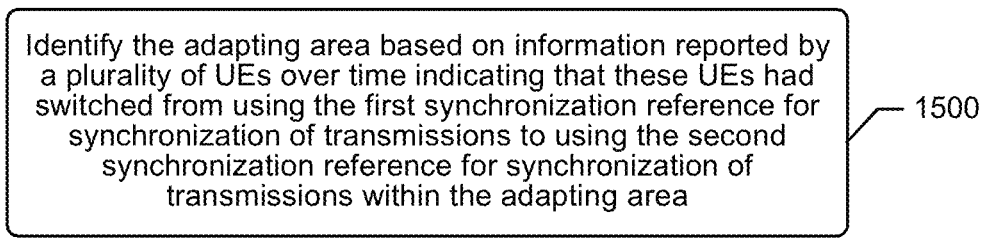

FIG. 15 is a flowchart of a further related method of operating the network node to identify 1400 the adapting area where UEs are likely to switch from using the first synchronization reference to using the second synchronization reference. Referring to FIG. 15, the network node identifies 1500 the adapting area based on information reported by a plurality of UEs over time indicating that these UEs had switched from using the first synchronization reference for synchronization of transmissions to using the second synchronization reference for synchronization of transmissions within the adapting area.

The network node may further identify 1500 the adapting area based on information indicating a geographic location of the UEs when they switched from using the first synchronization reference to using the second synchronization reference. For example, the network node may monitor over time reports from UEs that are indicating they are switching from the first to the second synchronization reference to identify a statistically significant pattern of UEs switching in a geographic region, which the network node may then define as the adapting area.

1.4 Upon Sending/Receiving Indication of Synchronization Reference from UE

The UE indicates the synchronization reference being used for V2X to the eNB.

1.4.1 Embodiment a, First Sub-Embodiment

In a first sub-embodiment, when the eNB receives a synchronization reference indication from the UE that is different from the synchronization reference of the UE stored in the eNB, i.e. eNB considers the UE to have changed its synchronization reference, the eNB calculates the RelativeResourceIdentifier of the granted but not used resources based on new synchronization reference of the UE, and configures the information of RelativeResourceIdentifier calculated to the UE.

The UE uses the resources configured by the eNB based on its synchronization reference.

Various operations and methods that can be performed for this embodiment are explained below with reference to FIG. 5:

Step 0: At T1, the UE is using eNB synchronization reference, the eNB grants resources X (RelativeResourceIdentifier=(f1, 90, 7)) and Y(RelativeResourceIdentifier= (f1, 91, 2)) to the UE.

Step 1: At T2, the UE reports it is using GNSS synchronization reference.

Step 2: Responsive to the UE report, the eNB identifies there is one unused resource: Y. The eNB calculates RelativeResourceIdentifier of resource Y based on GNSS synchronization reference. As a result, RelativeResourceIdentifier of Y is (f1, 90, 7).

Step 3: The eNB configures resources Y (RelativeResourceIdentifier=(f1, 90, 7)) to the UE.

Accordingly, referring again to FIG. 8, in one embodiment the first synchronization reference is an eNB synchronization reference signal, the RelativeResourceIdentifier is configured to identify a system frame number and a subframe number of the eNB synchronization reference signal, the new relative resource identifier is a new RelativeResourceIdentifier, the second synchronization reference is a GNSS synchronization reference, and the new RelativeResourceIdentifier is configured to identify a system frame number and a subframe number of the GNSS synchronization reference signal.

1.4.2 Embodiment A, Second Sub-Embodiment

In a second sub-embodiment, when the eNB receives a synchronization reference indication from the UE that is different from the synchronization reference of the UE stored in the eNB, i.e. the eNB considers the UE to have changed its synchronization reference, the eNB operates to:
  for the resources granted but not yet used, the eNB recycles those resources and the eNB reserves their MirrorResources;
  the eNB consider the MirrorResources being granted to the UE; and
  the eNB does not grant new resources to the UE.

The UE continues using the resource granted, but with new synchronization reference.

Various operations and methods that can be performed for this embodiment are explained below with reference to FIG. 5:

Step 0: At T1, the UE is using eNB synchronization reference, eNB grants resources X (RelativeResourceIdentifier=(f1, 90, 7)) and Y(RelativeResourceIdentifier=(f1, 91, 2)) to the UE.

Step 1: At T2, the UE reports it is using GNSS synchronization reference

Step 2: Responsive to the UE report, the eNB identifies there is one unused resources: Y. The eNB calculates MirrorResources of "Y", i.e. the resource being specified by RelativeResourceIdentifier=(f1, 91, 2) in GNSS synchronization reference, which is "Z".

Step 3: The eNB designates "Z" to be granted to the UE.

Step 4: The eNB recycles the resource "Y" for use by another UE.

Figure 11:
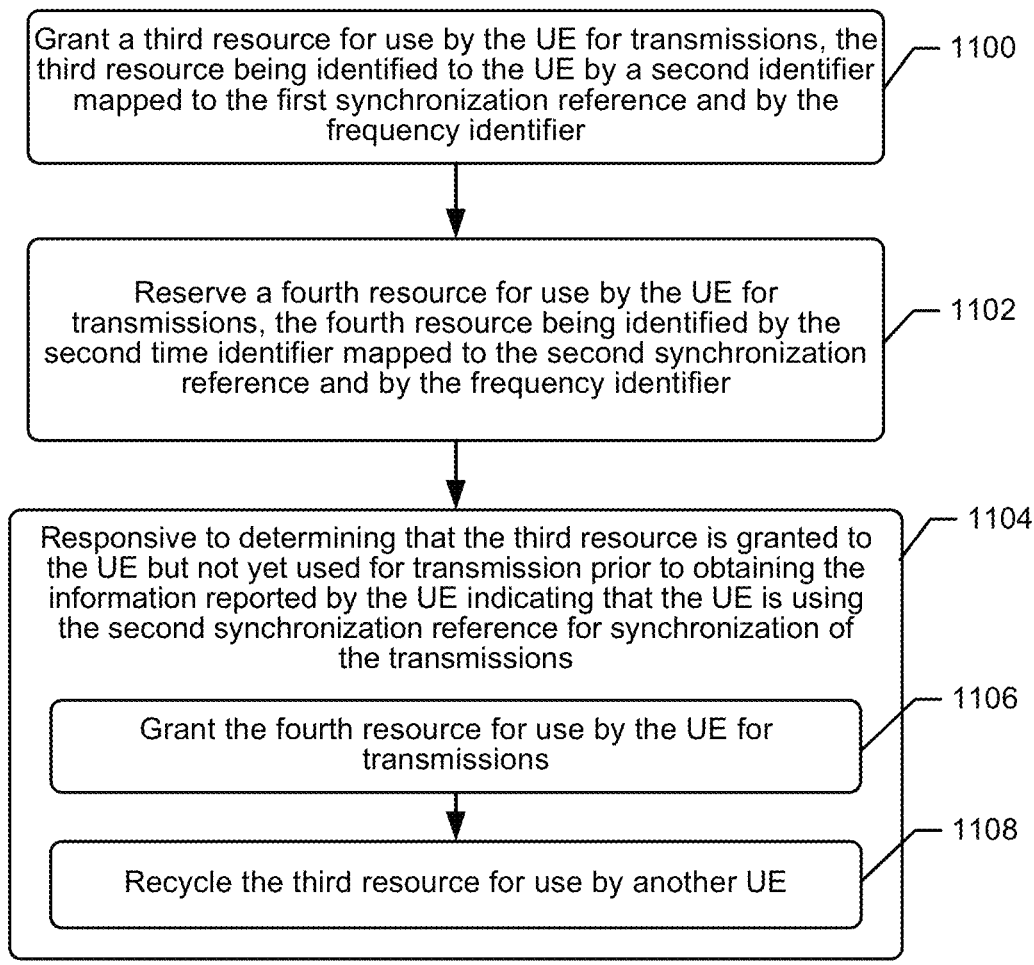

FIG. 11 is a flowchart of a related method of operating a network node providing control in a RAN. Referring to FIG. 11, prior to the information being reported 806 (FIG. 8) by the UE, the network node grants 1100 a third resource (e.g., Y in the present sub-embodiment) for use by the UE for transmissions. The third resource being identified to the UE by a second time identifier (e.g., 91, 2 in RelativeResourceIdentifier=(f1, 91, 2) in the present sub-embodiment) mapped to the first synchronization reference (e.g., eNB synch) and by the frequency identifier. Responsive to the information reported by the UE indicating that the UE is using the second synchronization reference (e.g., GNSS sync) for synchronization of the transmissions, the network node reserves 1102 a fourth resource (e.g., Z in the present sub-embodiment) for use by the UE for transmissions. The fourth resource (e.g., Z) being identified by the second time identifier mapped to the second synchronization reference (e.g., system frame 91 and sub-frame 2 relative to GNSS sync) and by the frequency identifier. The network node responds to determining 1104 that the third resource is granted to the UE but not yet used for transmission prior to obtaining the information reported by the UE indicating that the UE is using the second synchronization reference for synchronization of the transmissions, by granting 1106 the fourth resource for use by the UE for transmissions and recycling 1108 the third resource for use by another UE.

2.0 Embodiment B—UE Adapts Different Synchronization Reference

When a UE changes its synchronization reference, the UE determines whether there is no ongoing transmission or there is no resource which is configured by the eNB for the UE but not yet used by the UE, and, if so, the UE indicates the synchronization reference it is using to the eNB.

In contrast, when the UE changes its synchronization reference and determines that there is ongoing transmission and there is one or more resources which are configured by the eNB for the UE but not used by the UE, the UE performs operations to:
  the UE calculates RelativeResourceIdentifier of the unused resource using the new synchronization reference;
  the UE uses the resources specified by the new RelativeResourceIdentifier based on the new synchronization reference; and
  the UE does not indicate the synchronization reference it is using to the eNB until all resources granted to the UE are being used.
  When the UE needs to request new resources before all resources granted the UE are being used, e.g. the UE may need to request one shot resources when it is using semi-persistent scheduled (SPS) resources, the UE responsively indicates the synchronization reference to the eNB, and stops using granted resources until further configuration is received from the eNB.

Figure 16:
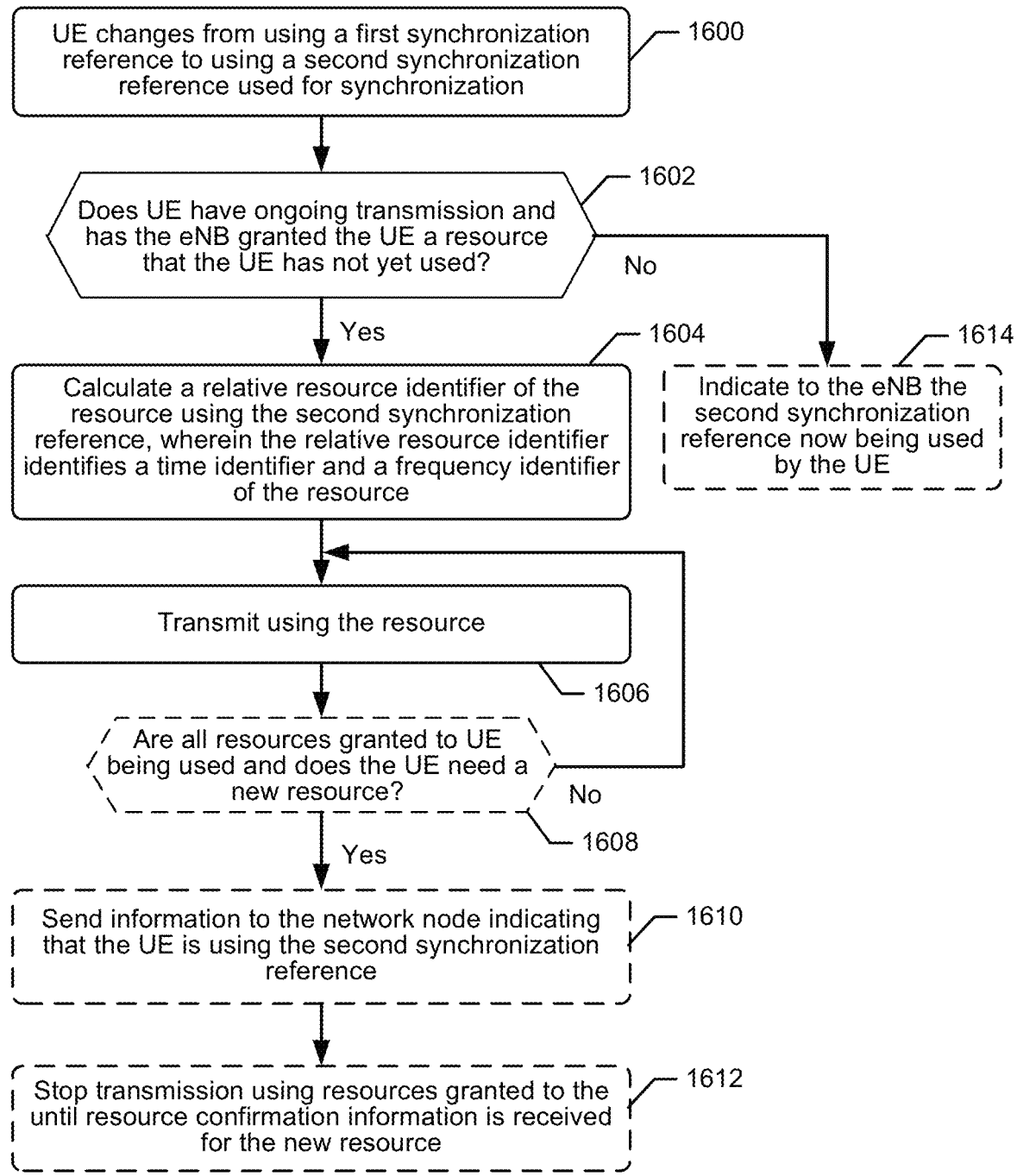
FIG. 16 is a flowchart of related methods of operating a UE according to some embodiments of inventive concepts.

FIG. 16 is a flowchart of related methods of operating a UE. It is to be understood that the operations shown in the illustrated boxes may be performed in an order other than what is illustrated. For example, in some embodiments the operations illustrated in box 1610 are performed following the operations shown in box 1602 and before the operations shown in box 1604.

Referring to FIG. 16, the UE changes 1600 from using a first synchronization reference for synchronization of transmissions to using a second synchronization reference for synchronization of transmissions. The UE determines 1602 whether the UE has an ongoing transmission and has a network node granted the UE a resource that the UE has not yet used, and, if so, the UE calculates 1604 a relative resource identifier of the resource using the second synchronization reference, wherein the relative resource identifier identifies a time identifier and a frequency identifier of the resource. The UE then transmits 1606 using the resource.

In a further embodiment, responsive to the determining 1602 that the UE does not have an ongoing transmission or that the network node has not granted the UE a resource that the UE has not yet used, the UE sends 1614 information to the network node indicating that the UE is using the second synchronization reference.

In a further embodiment, following the UE changing 1600 from using the first synchronization reference to using the second synchronization reference and further responsive to determining 1608 that all resources granted by the network node for use by the UE are being used, the UE sends 1610 information to the network node indicating that the UE is using the second synchronization reference.

In a further embodiment, following the UE changing 1600 from using the first synchronization reference to using the second synchronization reference and further responsive to determining 1608 that all resources granted by the network node for use by the UE are being used and that the UE needs to request a new resource from the network node, the UE sends 1610 information to the network node indicating that the UE is using the second synchronization reference, and stops 1612 transmission using resources granted by the network node until resource configuration information is received. Responsive to the network node configuring the UE with the new resource, the UE restarts transmitting using the resources and the new resource.

Example Modules

Figure 17:
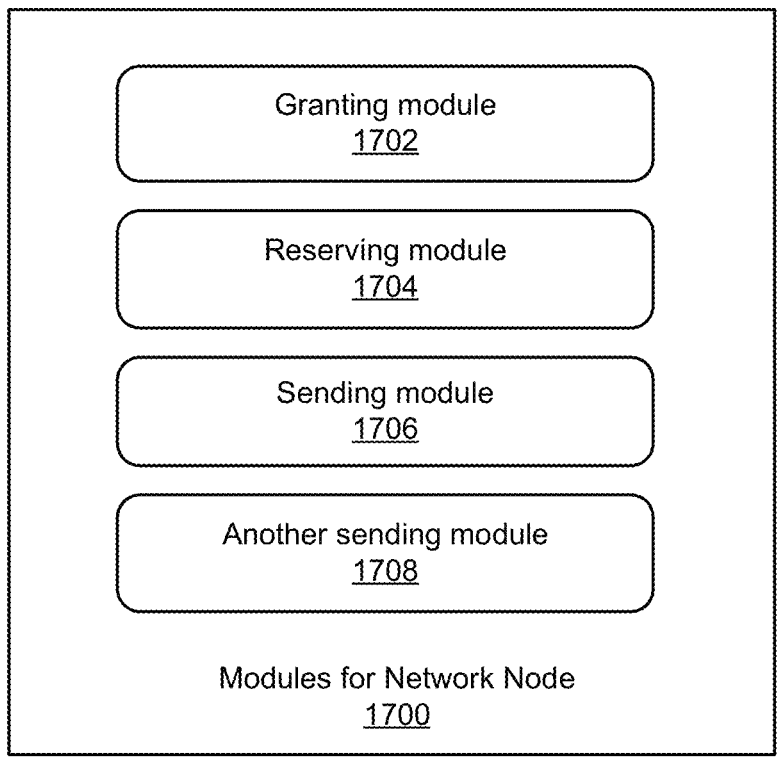
FIG. 17 illustrates modules for a network node that perform operations according to some embodiments of inventive concepts.

FIG. 17 illustrates modules 1700 for a network node 300 that perform operations as disclosed herein according to some embodiments of network nodes, such as an eNB. The modules include a granting module 1702, a reserving module 1704, a sending module 1706, and another sending module 1708.

The granting module 1702 is for granting 800 (FIG. 8) a first resource for use by a UE for transmissions. The first resource being identified by a time identifier mapped to a first synchronization reference and by a frequency identifier. The time identifier and the frequency identifier being identified by a relative resource identifier.

The reserving module 1704 is for reserving 802 (FIG. 8) a second resource for use by the UE for transmissions. The second resource being identified by the time identifier mapped to a second synchronization reference and by the frequency identifier. The first and second synchronization references can be used by a UE for synchronization of the transmissions.

The sending module 1706 is for sending 804 (FIG. 8) the relative resource identifier to the UE use in controlling the UE's transmissions. The another sending module 1708 is for, responsive to information reported by the UE indicating that the UE is using the second synchronization reference for synchronization of the transmissions, sending 806 (FIG. 8) to the UE a new relative resource identifier that identifies a time identifier mapped to the second synchronization reference that corresponds to a location of the second resource and identifies the frequency.

Figure 18:
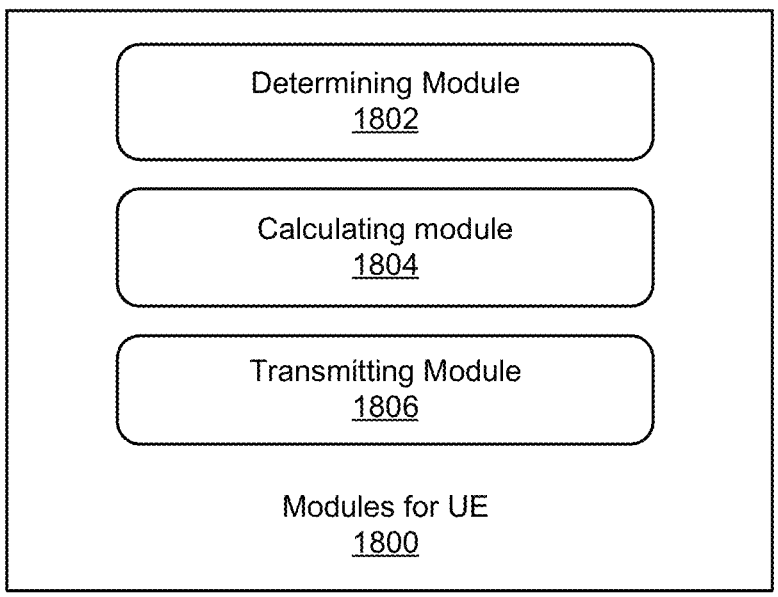
FIG. 18 illustrates modules for a UE that perform operations according to some embodiments of inventive concepts.

FIG. 18 illustrates modules 1800 for a UE that perform operations as disclosed herein according to some embodiments for a UE. The modules 1800 include a determining module (1802), a calculating module (1804), and a transmitting module (1806).

The determining module 1802 is for, responsive to the UE changing 1600 (FIG. 16) from using a first synchronization reference for synchronization of transmissions to using a second synchronization reference for synchronization of transmissions, determining 1602 (FIG. 16) whether the UE has an ongoing transmission and has a network node granted the UE a resource that the UE has not yet used;

The calculating module 1804 is for, responsive to the determination 1602 (FIG. 16) being that the UE has the ongoing transmission and the network node has granted the UE the resource that the UE has not yet used, calculating 1604 (FIG. 16) a relative resource identifier of the resource using the second synchronization reference, wherein the relative resource identifier identifies a time identifier and a frequency identifier of the resource. The transmitting module 1806 is for transmitting 1606 (FIG. 16) using the resource.

Figure 19:
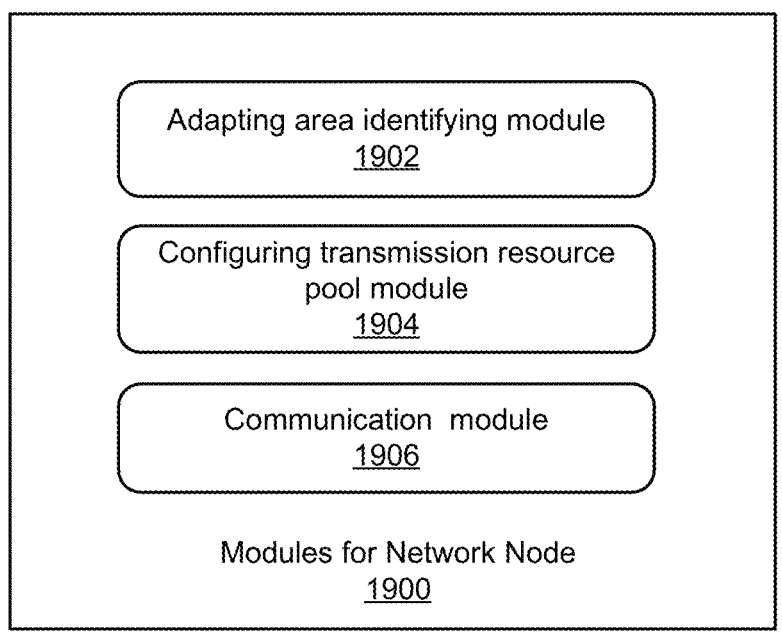
FIG. 19 illustrates modules for a network node that perform operations according to some alternative embodiments of inventive concepts.

FIG. 19 illustrates modules 1900 for a network node 300 that perform operations as disclosed herein according to some embodiments of network nodes, such as an eNB. The modules include an adapting area identifying module 1902, a configuring transmission resource pool module 1904, and a communication module 1906.

The adapting area identifying module 1902 is for identifying 1400 (FIG. 14) an adapting area where UEs are likely to switch from using a first synchronization reference for synchronization of transmissions to using a second synchronization reference for synchronization of transmissions. The configuring transmission resource pool module 1904 operates to, for a transmission resource pool that will be used by a UE that is located in a zone that at least partially overlaps the adapting area, configure 1402 (FIG. 14) resources for the transmission resource pool that are defined to correspond to both of the first synchronization reference and the second synchronization reference. The communication module 1906 is for communicating 1404 (FIG. 14) the transmission resource pool to the UE.

Abbreviations and Explanations

3G Third Generation of Mobile Telecommunications Technology
3GPP Third Generation Partnership Project
BSM Basic Safety Message
BSR Buffer Status Report
BW Bandwidth
CAM Cooperative Awareness Message
CBR Channel Busy Ratio
D2D Device-to-Device Communication
DBS Delay-Based Scheduler
DL Downlink
DENM Decentralized Environmental Notification Message
DMRS Demodulation reference signals
DPTF Data Packet Transmission Format
DSRC Dedicated Short-Range Communications
eNB eNodeB
ETSI European Telecommunications Standards Institute
IP Internet Protocol
LCG Logical Channel Group
LCID Logical Channel Identity
LTE Long-Term Evolution
MAC Medium Access Control
MAC CE MAC Control Element
NW Network
OCC Orthogonal cover code
PDCCH Physical Downlink Control Channel
PDU Packet Data Unit
PPPP ProSe Per Packet Priority
PRB Physical Resource Block
ProSe Proximity Services
PUCCH Physical Uplink Control Channel
PUSCH Physical Uplink Shared Channel
RRC Radio Resource Control
RS Reference Signals
SAE Society of the Automotive Engineers
SCI Sidelink Control Information
SFN System Frame Number
SL Sidelink
SLSS Sidelink Synchronization Signals
SPS Semi Persistent Scheduling
TF Transport Format
TTI Transmission Time Interval
UE User Equipment
UL Uplink
V2I Vehicle-to-Infrastructure
V2P Vehicle-to-Pedestrian
V2V Vehicle-to-vehicle communication
V2x Vehicle-to-anything-you-can-imagine
wrt with respect to

REFERENCES

[1] 3GPP TS 36.331 V14.0.0, Technical Specification Group Radio Access Network; Evolved Universal Terrestrial Radio Access (E-UTRA); Medium Access Control (MAC) protocol specification (Release 14).

[2] R1-1611081, Final Report of 3GPP TSG RAN WG1 #86bis v1.0.0, 3GPP TSG RAN WG1 Meeting #87, Reno, USA, 14-18 Nov. 2016.

[3] R2-1702343 Report from LTE Break-Out Session (V2V, V2X, FeD2D, Short TTI, MIMO), 3GPP TSG-RAN WG2 #97, Athens, Greece, 13-17 Feb. 2017.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method of operating a network node providing control in a radio access network ("RAN"), the method comprising:
    granting a first resource for use by a user equipment ("UE") for transmissions, the first resource being identified by a first time identifier mapped to a first synchronization reference and by a first frequency identifier, the first time identifier and the first frequency identifier being identified by a first relative resource identifier;
    reserving a second resource for use by the UE for transmissions, the second resource being identified by the first time identifier mapped to a second synchronization reference and by the first frequency identifier, wherein the first synchronized reference and the second synchronization references are usable by the UE for synchronization of the transmissions;
    transmitting the first relative resource identifier to the UE;
    responsive to transmitting the first relative resource identifier to the UE, receiving information reported by the UE indicating that the UE is using the second synchronization reference for synchronization of the transmissions; and
    responsive to receiving the information, transmitting to the UE a second relative resource identifier that identifies a second time identifier mapped to the second synchronization reference that corresponds to a location of the second resource and identifies a frequency.

2. The method of claim 1, wherein the first relative resource identifier comprises a RelativeResourceIdentifier identifying the frequency, a system frame number, and a subframe number; and
    wherein transmitting the first relative resource identifier to the UE comprises transmitting the RelativeResourceIdentifier through a base station ("eNB").

3. The method of claim 2, wherein the first synchronization reference is an eNB synchronization reference signal,
    wherein the RelativeResourceIdentifier is configured to identify a system frame number and a subframe number of the eNB synchronization reference signal,
    wherein the first relative resource identifier comprises a new RelativeResourceIdentifier,
    wherein the second synchronization reference is a Global Navigation Satellite System ("GNSS") synchronization reference, and
    wherein the new RelativeResourceIdentifier is configured to identify a system frame number and a subframe number of the GNSS synchronization reference signal.

4. The method of claim 2, wherein the first synchronization reference is a Global Navigation Satellite System ("GNSS") synchronization reference,
    wherein the RelativeResourceIdentifier is configured to identify a system frame number and a subframe number of the GNSS synchronization reference signal,
    wherein the new relative resource identifier comprises a new RelativeResourceIdentifier,
    wherein the second synchronization reference is an eNB synchronization reference, and
    wherein the new RelativeResourceIdentifier is configured to identify a system frame number and a subframe number of the eNB synchronization reference signal.

5. The method of claim 1, further comprising:
    determining that a threshold time has elapsed since the first resource was granted without the network node receiving the information indicating that the UE is using the second synchronization reference for synchronization of the transmissions; and
    responsive to determining that the threshold time has elapsed since the first resource was granted without the network node receiving the information, recycling the second resource for use by another UE.

6. The method of claim 1, further comprising:
    prior to receiving the information reported by the UE, granting a third resource for use by the UE for transmissions, the third resource being identified to the UE by a third time identifier mapped to the first synchronization reference and by the first frequency identifier;
    responsive to receiving the information reported by the UE indicating that the UE is using the second synchronization reference for synchronization of the transmissions, reserving a fourth resource for use by the UE for transmissions, the fourth resource being identified by the third time identifier mapped to the second synchronization reference and by the first frequency identifier;
    responsive to determining that the third resource is granted to the UE but not yet used for transmission prior to obtaining the information reported by the UE indicating that the UE is using the second synchronization reference for synchronization of the transmissions, granting the fourth resource for use by the UE for transmissions; and
    responsive to determining that the third resource is granted to the UE but not yet used for transmission prior to obtaining the information reported by the UE indicating that the UE is using the second synchronization reference for synchronization of the transmissions, recycling the third resource for use by another UE.

7. The method of claim 1, further comprising:
determining that the UE is entering or exiting a defined adapting area where it is likely that the UE will switch from synchronizing using the first synchronization reference to using the second synchronization reference; and
selecting the first synchronization reference for use in the granting of the first resource for use by the UE for transmission based on determining that the UE is entering or exiting the defined adapting area.

8. The method of claim 1, further comprising:
determining that the UE is entering or exiting a defined adapting area where it is likely that the UE will switch from synchronizing using the first synchronization reference to using the second synchronization reference; and
initiating reservation of the second resource for use by the UE for transmissions responsive to the determining based on determining that the UE is entering or exiting the defined adapting area.

9. A network node comprising:
processing circuitry; and
memory coupled to the processing circuitry and having instructions stored therein that, when executed by the processing circuitry, causes the network node to perform operations comprising:
granting a first resource for use by a user equipment ("UE") for transmissions, the first resource being identified by a first time identifier mapped to a first synchronization reference and by a first frequency identifier, the first time identifier and the first frequency identifier being identified by a first relative resource identifier;
reserving a second resource for use by the UE for transmissions, the second resource being identified by the first time identifier mapped to a second synchronization reference and by the first frequency identifier, wherein the first synchronized reference and the second synchronization references are usable by the UE for synchronization of the transmissions;
transmitting the first relative resource identifier to the UE;
responsive to transmitting the first relative resource identifier to the UE, receiving information reported by the UE indicating that the UE is using the second synchronization reference for synchronization of the transmissions; and
responsive to receiving the information, transmitting to the UE a second relative resource identifier that identifies a second time identifier mapped to the second synchronization reference that corresponds to a location of the second resource and identifies a frequency.

10. A method of operating a network node providing control in a radio access network ("RAN"), the method comprising:
identifying an adapting area where user equipments ("UEs") are likely to switch from using a first synchronization reference for synchronization of transmissions to using a second synchronization reference for synchronization of transmissions;
for a transmission resource pool that will be used by a UE that is located in a zone that at least partially overlaps the adapting area, configuring resources for the transmission resource pool that are defined to correspond to both of the first synchronization reference and the second synchronization reference; and
responsive to configuring the resources for the transmission resource pool, communicating the transmission resource pool to the UE.

11. The method of claim 10, wherein configuring the resources for the transmission resource pool comprises:
configuring a pair of relative resource identifiers that identify a corresponding pair of resources for the transmission resource pool, one of the relative resource identifiers identifying a system frame number and a subframe number where one of the resources is located relative to the first synchronization reference, and the other one of the relative resource identifiers identifying a system frame number and a subframe number where the other one of the resources is located relative to the second synchronization reference; and
reserving at least the pair of resources for the transmission resource pool for use by at least one UE.

12. The method of claim 10, wherein the first synchronization reference is an eNB synchronization reference signal, and
wherein the second synchronization reference is a Global Navigation Satellite System, GNSS, synchronization reference.

13. The method of claim 10, wherein the first synchronization reference is a Global Navigation Satellite System ("GNSS") synchronization reference, and
wherein the second synchronization reference is an eNB synchronization reference.

14. A network node comprising:
processing circuitry; and
memory coupled to the processing circuitry and having instructions stored therein that, when executed by the processing circuitry, causes the network node to perform operations comprising:
identifying an adapting area where user equipments ("UEs") are likely to switch from using a first synchronization reference for synchronization of transmissions to using a second synchronization reference for synchronization of transmissions;
for a transmission resource pool that will be used by a UE that is located in a zone that at least partially overlaps the adapting area, configuring resources for the transmission resource pool that are defined to correspond to both of the first synchronization reference and the second synchronization reference; and
responsive to configuring the resources for the transmission resource pool, communicating the transmission resource pool to the UE.

15. A method of operating a user equipment ("UE") communicating with a radio access network ("RAN"), the method comprising:
responsive to the UE changing from using a first synchronization reference for synchronization of transmissions to using a second synchronization reference for synchronization of transmissions, determining whether the UE has an ongoing transmission and whether a network node has granted the UE a resource that the UE has not yet used;
responsive to determining that the UE has the ongoing transmission and the network node has granted the UE the resource that the UE has not yet used, calculating a relative resource identifier of the resource using the second synchronization reference, the relative resource identifier identifying a time identifier and a frequency identifier of the resource; and responsive to calculating the relative resource identifier of the resource, transmitting using the resource.

16. The method of claim 15, wherein the first synchronization reference is a base station ("eNB") synchronization reference signal,
wherein the relative resource identifier that is calculated identifies a system frame number and a subframe number of a Global Navigation Satellite System ("GNSS") synchronization reference.

17. The method of claim 15, further comprising:
following the UE changing from using the first synchronization reference to using the second synchronization reference and further responsive to determining that all resources granted by the network node for use by the UE are being used and that the UE needs to request a new resource from the network node, transmitting information to the network node indicating that the UE is using the second synchronization reference; and
following the UE changing from using the first synchronization reference to using the second synchronization reference and further responsive to determining that all resources granted by the network node for use by the UE are being used and that the UE needs to request a new resource from the network node, stopping transmission using resources granted by the network node until resource configuration information is received.

18. The method of claim 15, further comprising:
responsive to determining that the UE does not have an ongoing transmission or the network node has not granted the UE a resource that the UE has not yet used, sending information to the network node indicating that the UE is using the second synchronization reference.

19. The method of claim 15, wherein the first synchronization reference is a Global Navigation Satellite System ("GNSS") synchronization reference, and
wherein the relative resource identifier that is calculated identifies a system frame number and a subframe number of an eNB synchronization reference.

20. A user equipment CUED comprising:
processing circuitry; and
memory coupled to the processing circuitry and having instructions stored therein that, when executed by the processing circuitry, causes the UE to perform operations comprising:
responsive to the UE changing from using a first synchronization reference for synchronization of transmissions to using a second synchronization reference for synchronization of transmissions, determining whether the UE has an ongoing transmission and whether a network node has granted the UE a resource that the UE has not yet used;
responsive to determining that the UE has the ongoing transmission and the network node has granted the UE the resource that the UE has not yet used, calculating a relative resource identifier of the resource using the second synchronization reference, the relative resource identifier identifying a time identifier and a frequency identifier of the resource; and
responsive to calculating the relative resource identifier of the resource, transmitting using the resource.

* * * * *